United States Patent
Inglis

[15] 3,677,631
[45] July 18, 1972

[54] LAP DISSOLVE SLIDE PROJECTOR WITH SINGLE SHIFTABLE SLIDE TRAY

[72] Inventor: George M. Inglis, Rochester, N.Y.
[73] Assignee: Eastman Kodak Company, Rochester, N.Y.
[22] Filed: May 14, 1970
[21] Appl. No.: 37,232

[52] U.S. Cl................353/83, 353/90, 353/103
[51] Int. Cl..................G03b 21/14, G03b 23/00
[58] Field of Search..........353/82, 83, 90, 93, 94, 86, 353/103

[56] References Cited

UNITED STATES PATENTS

| | | |
|---|---|---|
| 3,264,937 | 8/1966 | Antas...................353/83 |
| 3,468,603 | 9/1969 | Kovarik et al............353/90 |
| 3,501,231 | 3/1970 | Fisher....................353/82 |
| 3,501,232 | 3/1970 | Jackson..................353/82 |

Primary Examiner—Leonard Forman
Assistant Examiner—Steven L. Stephan
Attorney—Robert W. Hampton and Steve W. Gremban

[57] ABSTRACT

A lap dissolve slide projector alternately displays slides supported in two laterally adjacent stationary slide gates provided with corresponding separate objective lens systems. A single multiple compartment slide tray is laterally movable by a tray supporting carriage and cam mechanism into alternate alignment with one gate and then the other, and is also advanced and retracted automatically so that the slides are fed into the projector and displayed in the sequence in which they are initially arranged in the tray and are returned to the tray in the same sequence.

17 Claims, 26 Drawing Figures

Patented July 18, 1972

GEORGE M. INGLIS
INVENTOR.

BY Steve W. Grumban
Robert W. Hampton
ATTORNEYS

GEORGE M. INGLIS
INVENTOR.

ATTORNEYS

Patented July 18, 1972

GEORGE M. INGLIS
INVENTOR.

BY Steve W. Grenban
Robert W Hampton
ATTORNEYS

Patented July 18, 1972

GEORGE M. INGLIS
INVENTOR.

BY *Steve W. Glamban*
*Robert W. Hampton*
ATTORNEYS

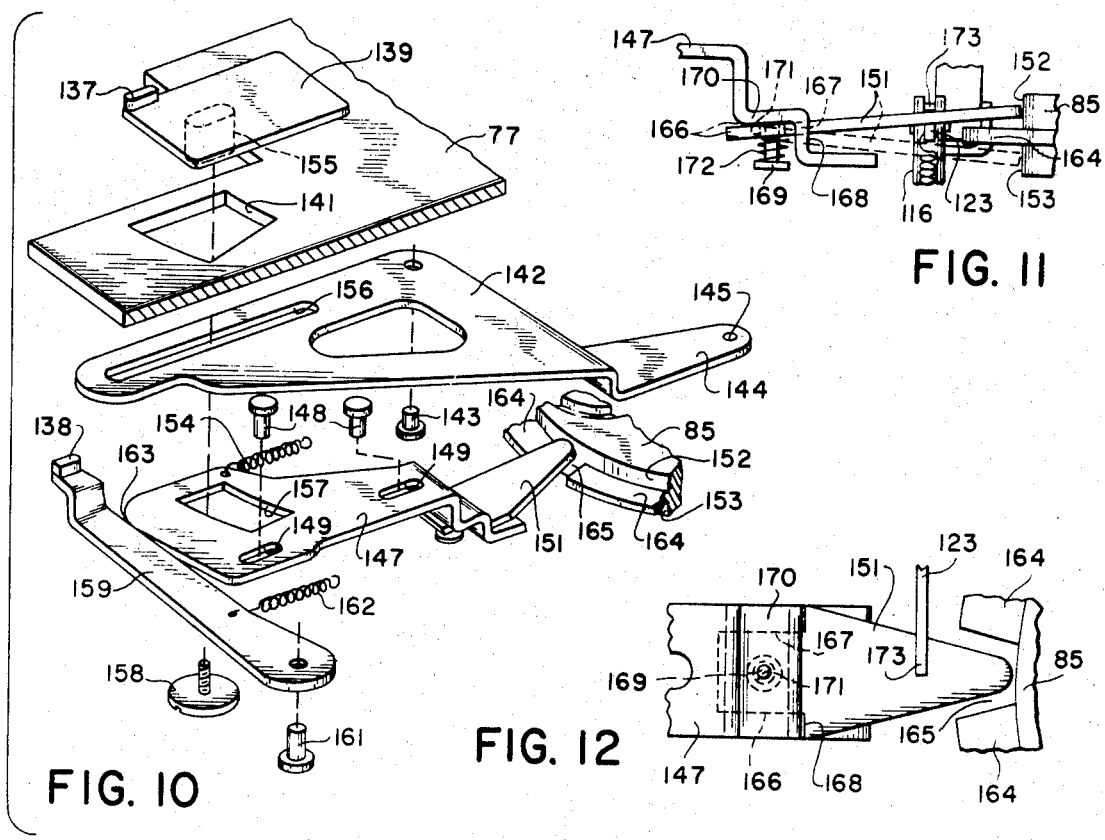
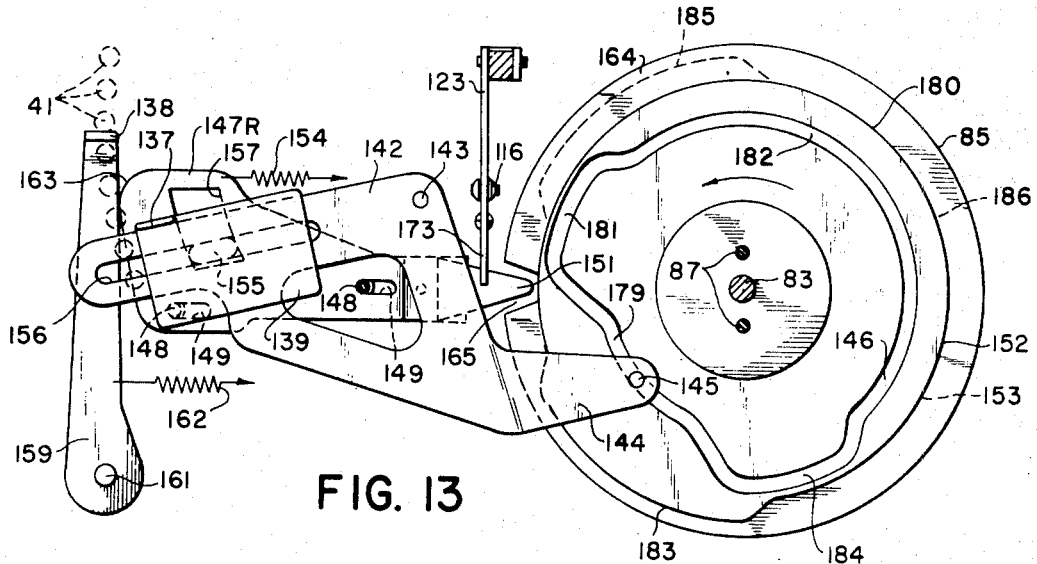
GEORGE M. INGLIS
INVENTOR.
BY Steve W. Grenban
Robert W Hampton
ATTORNEYS Patented July 18, 1972

GEORGE M. INGLIS
INVENTOR.

BY Steve W. Granban
Robert W. Hampton
ATTORNEYS

GEORGE M. INGLIS
INVENTOR.

BY Steve W. Gremlaw
Robert W. Hampton
ATTORNEYS

Patented July 18, 1972
3,677,631
11 Sheets-Sheet 9
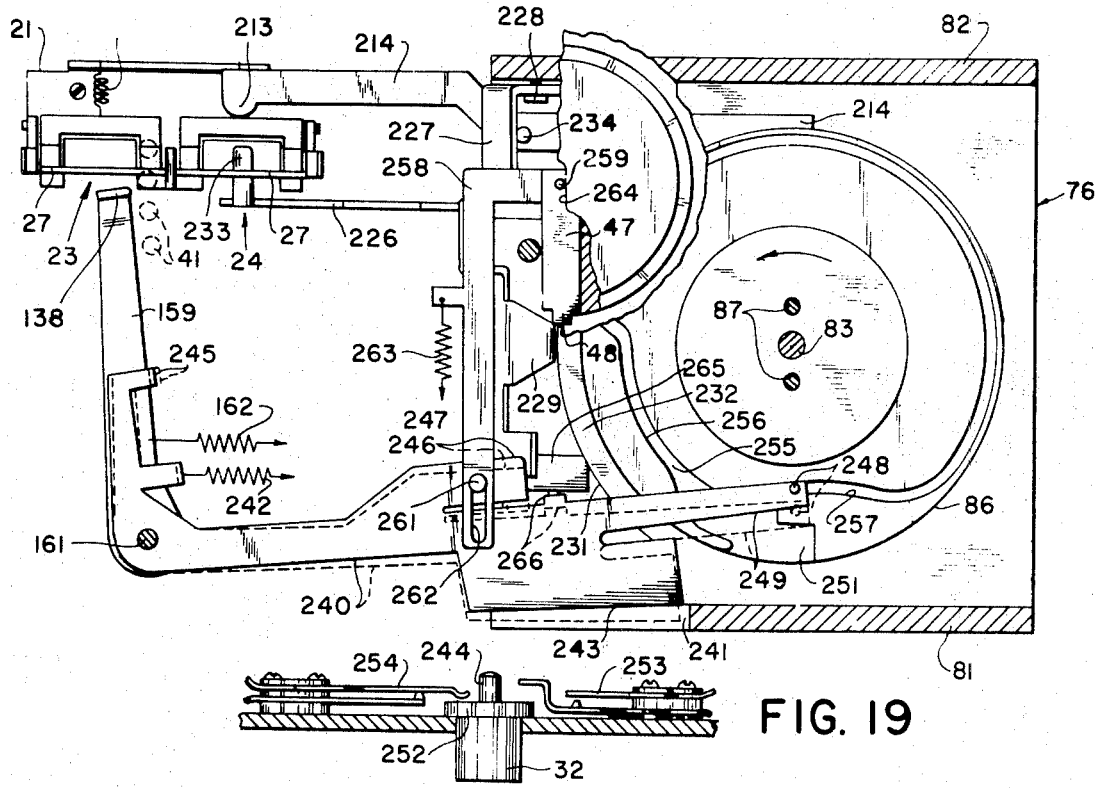
FIG. 19
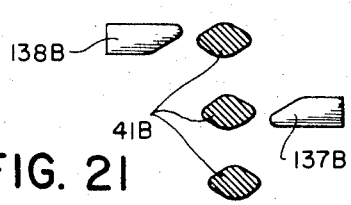
FIG. 20
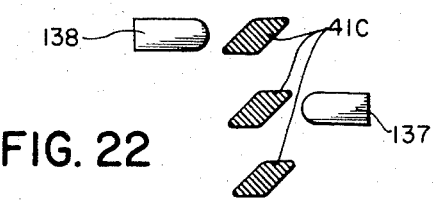
FIG. 21
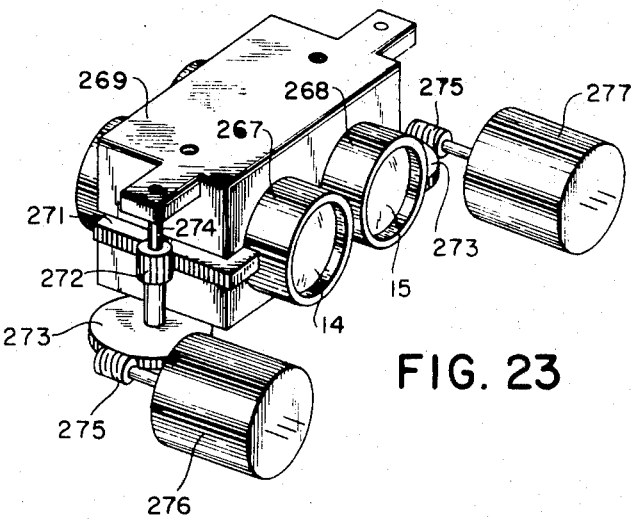
FIG. 23
FIG. 22
GEORGE M. INGLIS
INVENTOR.
BY *Steve W. Grambow*
*Robert W. Hampton*
ATTORNEYS

GEORGE M. INGLIS
INVENTOR.

BY *Steve W. Grambau*
*Robert W. Hampton*
ATTORNEYS

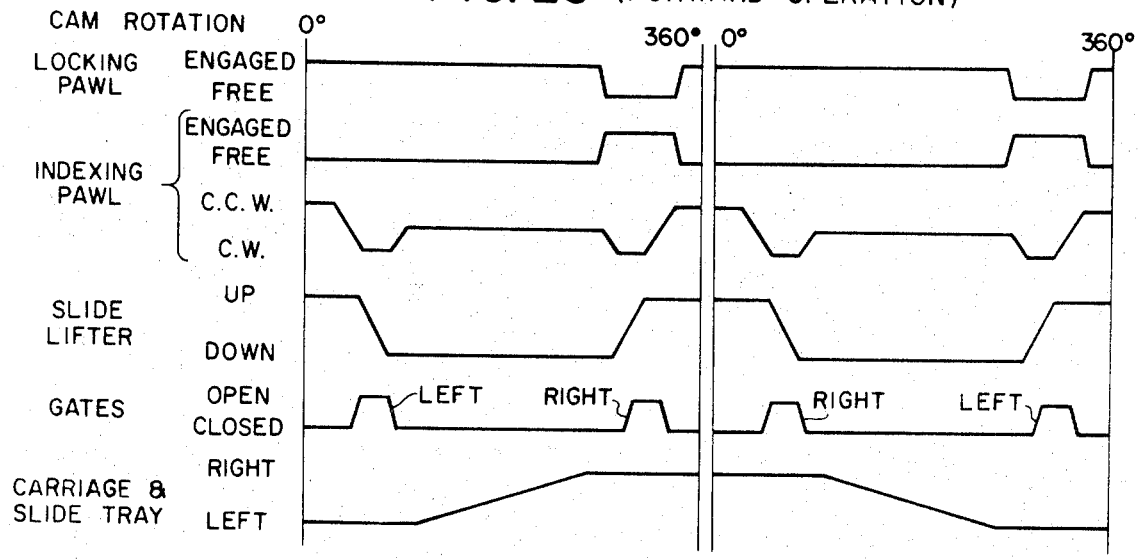
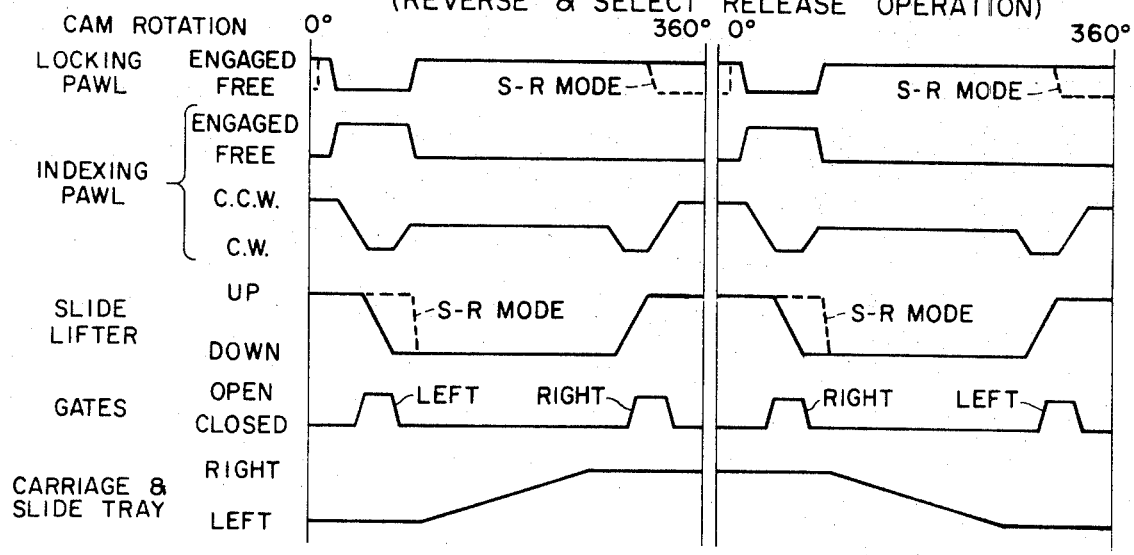

LAP DISSOLVE SLIDE PROJECTOR WITH SINGLE SHIFTABLE SLIDE TRAY

BACKGROUND OF THE INVENTION

1. Field of the Invention

The present invention relates to lap dissolve slide projectors which alternately display slides supported in side by side relation to each other in two laterally adjacent gates provided with respective separate lens systems, whereby one projected image gradually fades and disappears as the next projected image simultaneously comes into view. More particularly, the present invention enables such a projector to be loaded with a single slide tray projector which the slides are initially arranged in chronological display sequence and to which the slides are returned automatically in that same sequence after they have been displayed. The slide tray is further reciprocally movable by a tray supporting carriage and cam means between the two adjacent gates.

2. Description of the Prior Art

The pleasing effect of lap dissolve slide projection has long been recognized and has given rise to numerous attempts to develop commercially acceptable projectors of that type. Basically, such a projector generally includes two laterally adjacent stationary slide gates, each of which is associated with its own objective lens system, whereby an image of a slide in either gate can be projected at the same location on a projection screen. As the slide in one gate is being displayed, the previously projected slide is removed from the other gate and replaced by the next slide to be shown. To change from one projected image to the next, the brightness of the image being displayed is gradually reduced while the projected image of the slide in the other gate is gradually increased in brightness, thus causing the former image to fade away as the latter image simultaneously comes into view.

In most previously known lap dissolve projectors of the type described above, the fact that successive slides must be located alternately in two separate slide gates has necessitated the use of two slide trays, each of which provides slides only to the corresponding gate. Since the slides must be arranged in the two trays in uninterrupted alternate sequential order, this approach greatly complicates the task of editing or re-arranging the sequence in which the slides are to be displayed. Furthermore, the alternate sequential arrangement of the slides dictated by such a lap dissolve projector makes it impossible to display the same tray of slides in proper sequence with a conventional projector, or vice versa, without first re-arranging all of the slides. Alternatively, lap dissolve slide projectors of the same general type have been proposed which deliver successive consecutively arranged slides alternately into two slide gates from a single tray, but which do not preserve the original slide sequence, thus requiring the slides to be re-arranged each time they are displayed.

SUMMARY OF THE INVENTION

The present invention likewise involves slide projectors embodying two stationary slide gates provided with corresponding objective lens systems, as described above, but utilizes only one slide tray in which the slides are arranged in chronological display sequence. A tray shifting mechanism comprising a tray supporting carriage movable by a cam mechanism is incorporated in the projector for moving the tray laterally to align it alternately with one gate and then the other, and also advances and retracts the tray automatically so that the slides are fed into the projector and displayed in the same sequence in which they are originally arranged and are then returned to the tray in that same sequence. Although the invention can be adapted to other types of slide trays, the illustrative preferred embodiment employs rotary gravity feed trays of the popular type disclosed in U.S. Pat. No. 3,276,314, issued to the assignee of the present invention on Oct. 4, 1966, which are fully compatible with either the subject projector or with existing projectors, without requiring re-arrangement of the slide sequence.

In addition to providing the basic means for accomplishing the above-described mode of projector operation, the present invention also embodies many other advantageous features which are equally applicable to conventional tray loaded slide projectors to improve operational convenience and reliability and to minimize wear or accidental damage to the slides, such as the provision of cam means rotatable on an axis parallel to the rotational axis of a circular slide tray. Moreover, the subject projector also embodies simple and reliable means for allowing the slides to be shown in reverse order or in any other selected sequence and for providing remote control operation.

Various means for practicing the invention and other advantages and novel features thereof will be apparent from the following detailed description of the illustrative preferred embodiment of the invention, reference being made to the accompanying drawings in which like reference characters denote like elements.

BRIEF DESCRIPTION OF THE DRAWINGS

In the drawings:

FIG. 10 is an exploded perspective view of the elements, some of which are broken away, comprising the tray indexing mechanism of the projector;

FIG. 11 is a front elevational view of a portion of the elements of FIG. 10 showing the cam follower tongue member which actuates the pawl engaging and releasing slide of the mechanism shown in FIG. 10 and which is movable to two positions to permit the projector to display slides in either forward or reverse sequence;

FIG. 12 is a plan view of the cam follower tongue member shown in FIG. 11;

FIG. 13 is a plan view of the slide tray indexing mechanism comprising the various elements depicted in FIG. 10, showing the respective positions assumed by those elements while a slide is being projected;

FIG. 19 corresponds to FIG. 18 and depicts the respective positions of the illustrated projector elements during a slide changing operation or while the select-release mechanism is performing its intended function;

FIGS. 20 through 22 are schematic plan views illustrating alternate pawl and tray lug configurations adapted to prevent accidental misalignment between the lugs and pawls;

FIG. 23 is a perspective view of the lens focusing system of the projector;

FIG. 25 is a chart showing the timed relation between the functions of the various elements of the projector during two consecutive slide changing cycles performed in the projector's forward mode of operation; and FIG. 26 corresponds to FIG. 25 but shows the timed sequence in which the depicted functions occur when the projector is in its reverse or select-release mode of operation.

DESCRIPTION OF THE ILLUSTRATIVE PREFERRED EMBODIMENT

Figure 1:
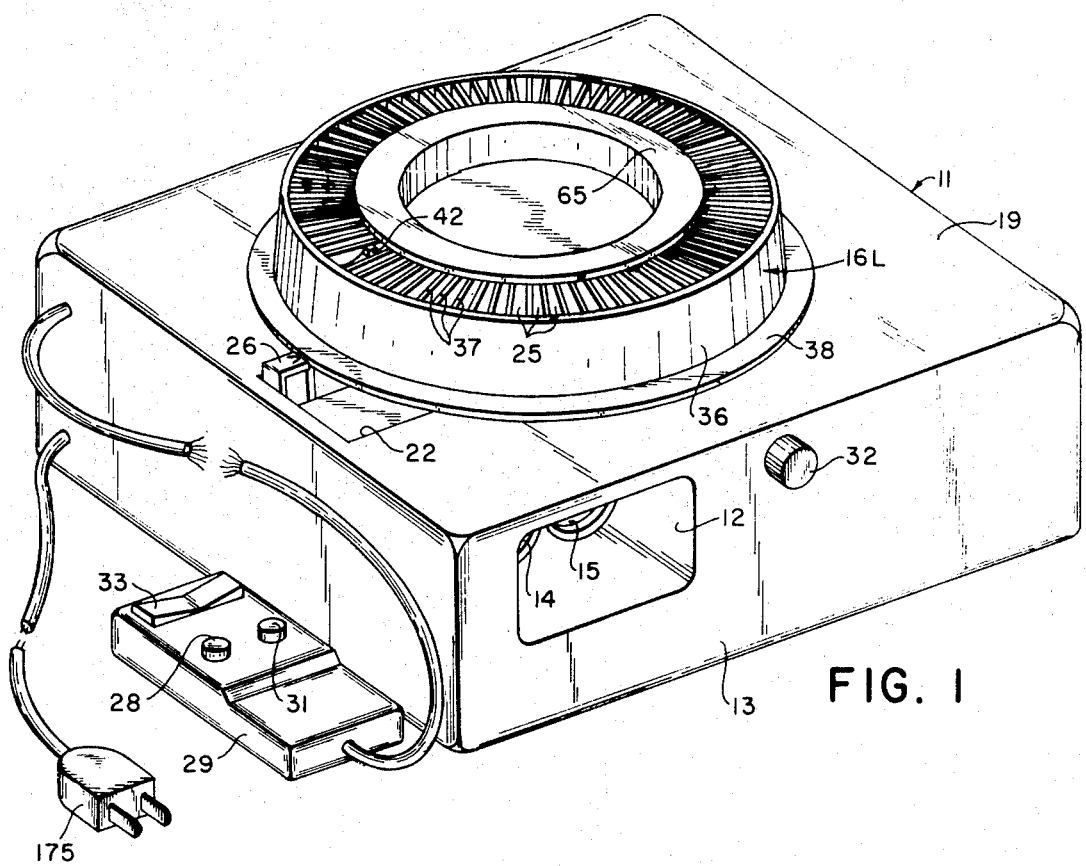
FIG. 1 is a perspective view of a lap dissolve projector comprising an illustrative preferred embodiment of the present invention.

To summarize the illustrated preferred embodiment of the present invention, without regard to specific structural and operational features hereinafter explained in detail, reference is first made to FIGS. 1–5. From those figures, it is apparent that the projector comprises a generally rectilinear housing 11 provided with an opening 12 in its front wall member 13 to accommodate two laterally adjacent generally parallel left and right objective lens assemblies 14 and 15. To simplify explanations of the construction and mode of operation of the projector, the terms "right" and "left" are used herein with reference to viewing the projector from the front and alternate right and left positions of various projector elements are indicated by the respective suffixes R or L following the corresponding reference character. Similarly, unless otherwise indicated, reference to clockwise or counterclockwise rotation of various elements of the projector mechanism will be understood to refer to a top view of such elements.

A multiple compartment rotary slide tray 16, corresponding generally to the one disclosed in the previously-identified Robinson patent, is removably mounted in a horizontal position on a cylindrical spindle 17, which projects upwardly through an elongate slot 18 in the flat top wall member 19 of housing 11. Spindle 17 is movable laterally to the two positions shown at 17L and 17R in FIG. 5, thereby effecting lateral movement of the slide tray to the corresponding positions shown at 16L and 16R in the same figure.

A slide gate structure 21 is located within housing 11 below opening 22 in the top wall member thereof and comprises two laterally adjacent left and right slide gates 23 and 24 aligned respectively with lens assemblies 14 and 15. When the slide tray is in its left position, one of the tray compartments 25 (see FIG. 1) is aligned with index pointer 26 and is located directly above left slide gate 23 so that a slide 27 in that compartment can be fed downwardly into that gate through opening 22 in housing 11. Similarly, when the slide tray is in its right position, the slide in the tray compartment aligned with pointer 26 can be loaded into gate 24.

The slides 27 are arranged in chronological display sequence in a clockwise direction in the slide tray, which is rotationally indexed by an indexing mechanism in the projector to position the tray compartments in vertical alignment with the film gates in coordinated relation with the lateral movement of the slide tray. While a slide is being projected in one of the film gates, the slide tray is positioned with the next slide located directly above the other gate, which is then empty and obscured from the corresponding projection lens system by a movable mask member. To display the next slide, the operator momentarily pushes the "forward" button 28 on remote control unit 29, which causes that slide to drop by gravity into a projection position in the empty gate. When this has been accomplished, the slide tray shifts automatically into its other lateral position. During this lateral movement of the slide tray, the mask member moves in unison therewith to gradually uncover the slide that was just loaded into the gate and simultaneously to gradually obscure the preceding slide; whereby the projected image of the former slide comes into view with increasing intensity while the image of the latter slide fades away.

When the slide tray has completed its lateral movement into alignment with the gate containing the previously displayed slide, the tray is rotationally retraced in a clockwise direction by one compartment increment to allow that slide to be raised into the tray compartment in which it was originally housed. Thereupon, the tray is advanced automatically in a counterclockwise direction by two compartment increments to locate the next slide in the display sequence directly above the now empty gate, thus completing a slide changing cycle. In response to the next actuation of the "forward" button, the same sequence of operations is repeated in coordination with the lateral movement of the tray in the opposite direction, thereby restoring the mechanism to its former condition. Consequently, each successive depression of the "forward" button causes the next slide to come into view on the screen as the preceding one fades out of view and is then returned to its original tray compartment. By depressing the "reverse" button 31 on the remote control unit, the operator can cause the mechanism to perform in the same general manner but with a different tray indexing sequence so that the previously displayed slide can be viewed again.

Because of the means employed to retain all of the slides in the slide tray when the tray is removed from the projector, the tray must be rotated to a predetermined loading position before it can be installed on or removed from the projector. During the operation of the projector described above, one slide is always located in a projection gate and the slide tray is at all times engaged by the tray indexing mechanism which controls its rotational indexing movement. Therefore, if the operator wishes to remove the tray without having displayed all of the slides or to skip one or more slides in the projection sequence, it is necessary first to raise the slide in the projector back into its proper tray compartment and then to disengage the indexing mechanism from the tray so that the latter can be rotated manually to the desired position while both gates remain empty. Accordingly, the projector is also provided with a mechanism which automatically performs those operations in response to manual depression of a "select-release" button 32 on the projector housing.

Since successive slides are projected alternately from one gate and then the other through the corresponding separate objective lens systems, focusing of the image being projected requires axial movement of the corresponding lens system but should not disturb the other lens system. Therefore, focusing switch bar 33 on the remote control unit 29 is automatically connected electrically with the focusing mechanism of the particular lens system then in use to allow that lens system to be adjusted forwardly or rearwardly by rocking the switch bar one way or the other, without disturbing the adjustment of the other lens system.

Slide Tray and Tray Spindle

Figure 2:
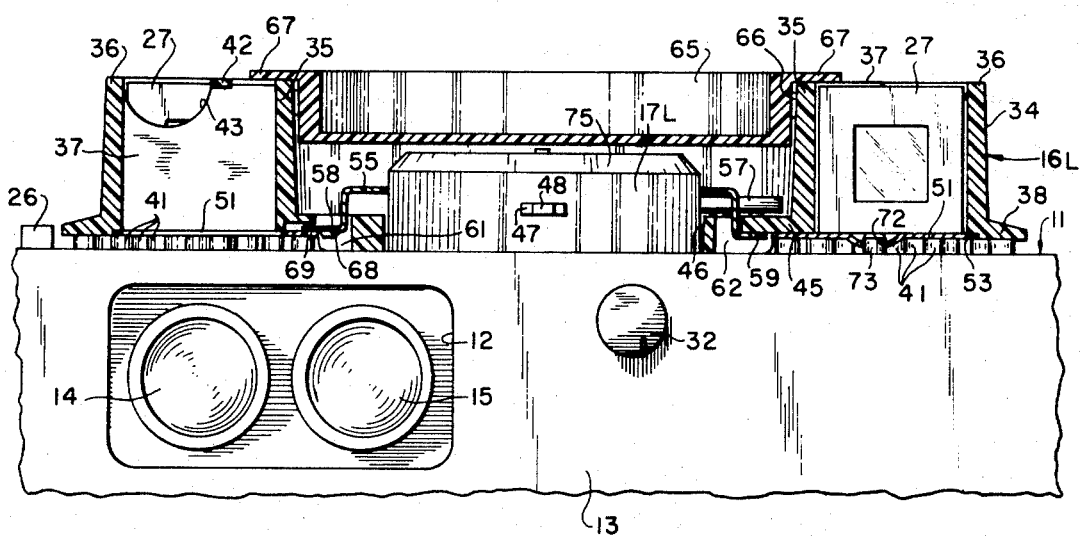
FIG. 2 is a fragmentary partially cross sectioned front elevational view of the projector shown in FIG. 1.
Figure 3:
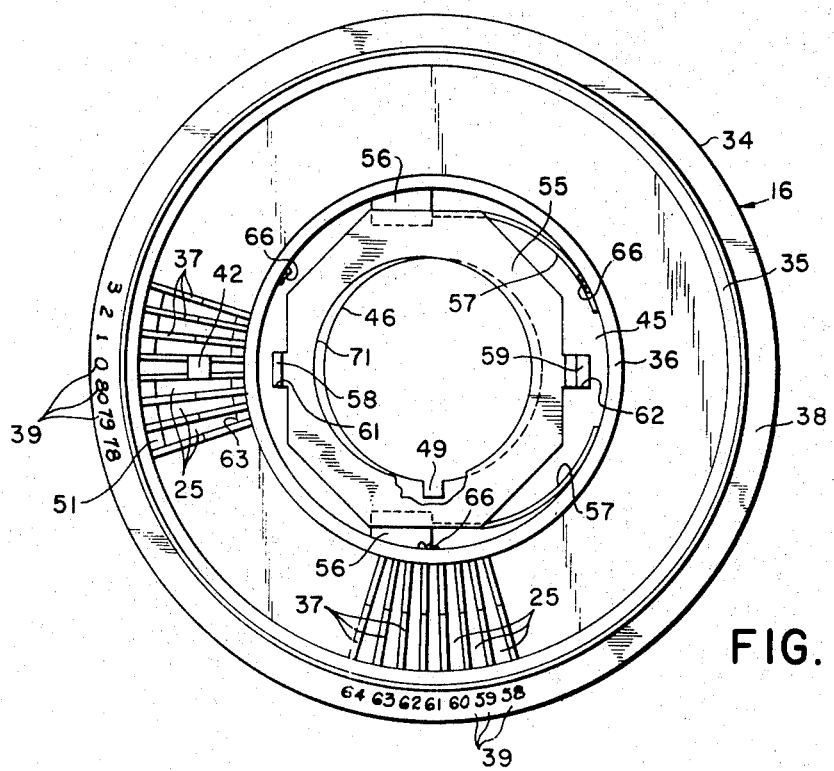
FIG. 3 is a top plan view of the slide tray used with the subject projector.
Figure 4:
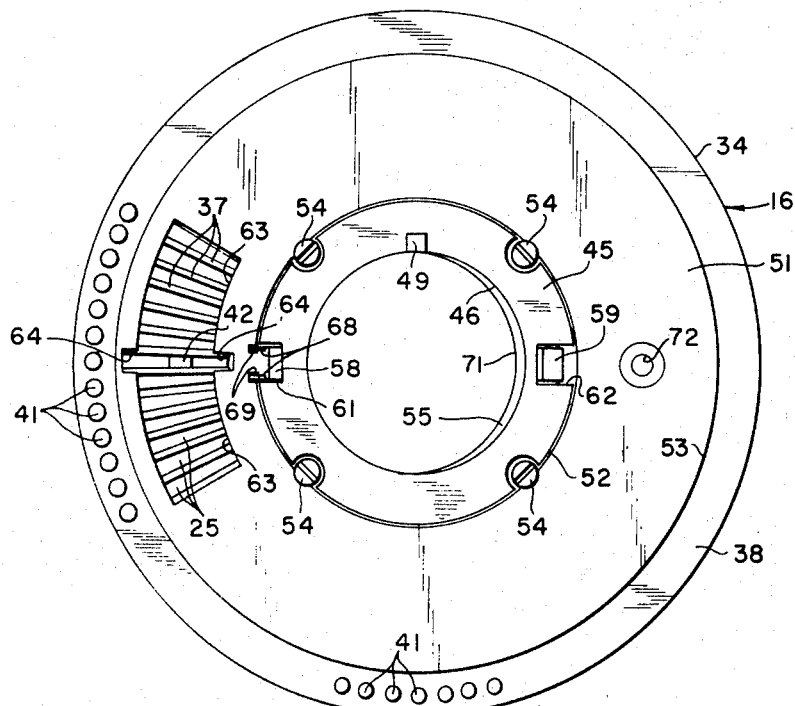
FIG. 4 is a bottom view of the slide tray shown in FIG. 3.

As best shown in FIGS. 2, 3 and 4, the slide tray 16 comprises a cylindrical plastic tray member 34 including concentric inner and outer shells 35 and 36 connected by a plurality of radial separators 37 to provide a corresponding plurality of equally spaced radially disposed slide compartments 25. In the illustrated embodiment, there are 81 separators and slide compartments in the tray member, but only a few of the separators and compartments are shown in FIG. 3 in order to simplify that figure. A peripheral rim 38 projecting outwardly from the lower edge of outer shell 36 is provided with reference numerals shown at 39, which correspond to and designate the respective slide compartments. Tray indexing lugs or pins 41 project downwardly from rim 38, each of such lugs likewise being in predetermined aligned relation to a corresponding one of the slide compartments. With the exception of the compartment aligned with the "0" reference numeral, which is provided with a top closure bridge 42, each of the slide compartments is adapted to receive slides from either its top or bottom end. As shown at numeral 43 in FIG. 2, each separator 37 includes an arcuate notch in its upper edge to facilitate manually installing and removing slides from the slide compartments.

An annular lip 45 projects inwardly from the inner tray shell 35 and defines a central circular hole 46 adapted to receive the cylindrical tray spindle 17 of the projector. As later described in connection with the detailed explanation of the select-release mechanism illustrated in FIGS. 18 and 19, a locking tongue 47 is slidably mounted in the tray spindle 17 and is retracted to the position illustrated in that figure during tray loading and unloading operations so that only the narrow tip 48 of the tongue projects beyond the periphery of the spindle. Notch 49 at the edge of central hole 46 in the slide tray is only of sufficient size to accommodate the narrow tip 48 of the locking tongue 47 and is located such that the slide tray 16 can be installed on or removed from the projector only when it is oriented with the "0" slide compartment positioned over one of the slide gates, i.e., only when the numeral "0" is aligned with index pointer 26. After the tray is installed on the projector, the locking tongue 47 is located above annular lip 45 and is extended automatically to the position shown in FIG. 5 to prevent tray 16 from being removed until the tray member 34 has been returned to its original loading position and the tongue has been retracted by the select-release mechanism.

The circular inner and outer edges of an annular metal disc 51 are received in shallow recesses in the tray member 34 which defines concentric inner and outer shoulders 52 and 53. The heads of four equally spaced screws 54 overlap the circular inner edge of disc 51 to retain the disc in position while allowing it to rotate on shoulder 52. A metal latch plate 55 is located within inner shell 35 of the tray member and is supported above annular lip 45 thereof by molded support bosses 56 and by its spring fingers 57, which rest on the top surface of lip 45 and bear laterally against the inner shell. Tongues 58 and 59 project downwardly from the latch plate through respective openings 61 and 62 in tray member lip 45 and are bent over below that lip to maintain latch plate 55 in place while allowing it to slide back and forth in the direction of the tongues 58, 59.

An arcuate opening 63 in metal disc 51 includes a pair of opposed notches 64, shown in FIG. 4, through which a slide can pass into and out of the slide compartment aligned therewith. Whenever the slide tray is removed from the projector, notches 64 are located directly below the unused "0" compartment so that the other slides in the tray cannot fall out of the lower ends of their respective compartments. A cap member 65 is removably installed on the tray in engagement with detent bosses 66 on the inner wall of shell 35 and includes a rim 67 which overlaps the upper edges of the slides 27 in the tray, thus likewise preventing the slides from falling out of the upper ends of the tray compartments 25 if tray 16 is inverted. To prevent disc 51 from rotating accidentally to a position at which notches 64 are aligned with a loaded tray compartment while the tray is removed from the projector, tongue 58 of latch plate 55 includes a pair of depending ears 68 engageable with mating slots 69 in the disc member 51. As long as tray 16 is removed from the projector, spring fingers 57 retain the latch plate 55 in the position shown in FIGS. 3 and 4, which is defined by the abutment of the inner ends of the spring fingers 57 against support bosses 56. Accordingly, the circular central hold 71 in the latch plate is offset slightly from the similar hole 46 in the tray body member 34 and ears 68 of latch tongue 58 remain in rotation blocking engagement with disc 51.

Figure 5:
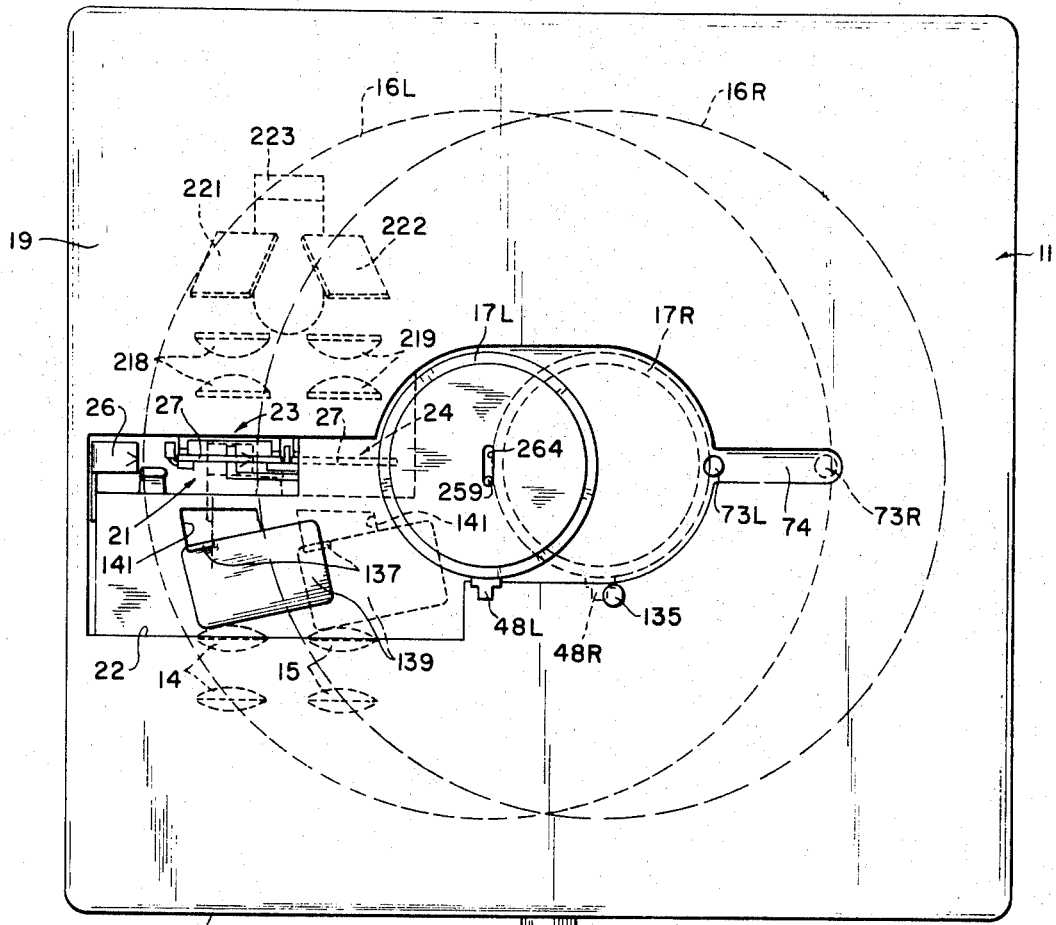
FIG. 5 is a plan view of the projector with the slide tray removed, illustrating in broken lines the two positions of the slide tray and the locations of the internal elements of the projector's optical system.

During the installation or loading of the slide tray onto the projector, tongue 47 initially aligns the "0" slide compartment with index pointer 26 and also aligns positioning hole 72 in metal disc 51 with positioning pin 73 (see FIG. 2), which projects upwardly through a slot 74 in the top wall of the projector housing as best seen in FIG. 5, and which moves laterally along that slot in unison with the lateral movement of tray spindle 17. As tray 16 is pressed downwardly to its loaded position, the beveled upper ends 75 of spindle 17 enters hole 71 in latch plate 55 and cams the plate away from the "0" tray compartment to withdraw tongue ears 68 from slots 69 in disc 51 as positioning pin 73 simultaneously enters disc positioning hole 72. Consequently the tray indexing mechanism can now rotate tray member 34 relative to disc 51, which is positioned with notches 64 of opening 63 in vertical alignment with one or the other of the slide gates. Since the "0" compartment of the slide tray member 34 must be located directly above a slide gate before tray 16 can normally be removed from the projector, tongue ears 68 re-engage slot 69 as such alignment of "0" compartment and slide gate occurs, thereby again locking the disc so that notches 64 are retained in alignment with the "0" slide compartment.

Mechanism Carriage

Figure 7:
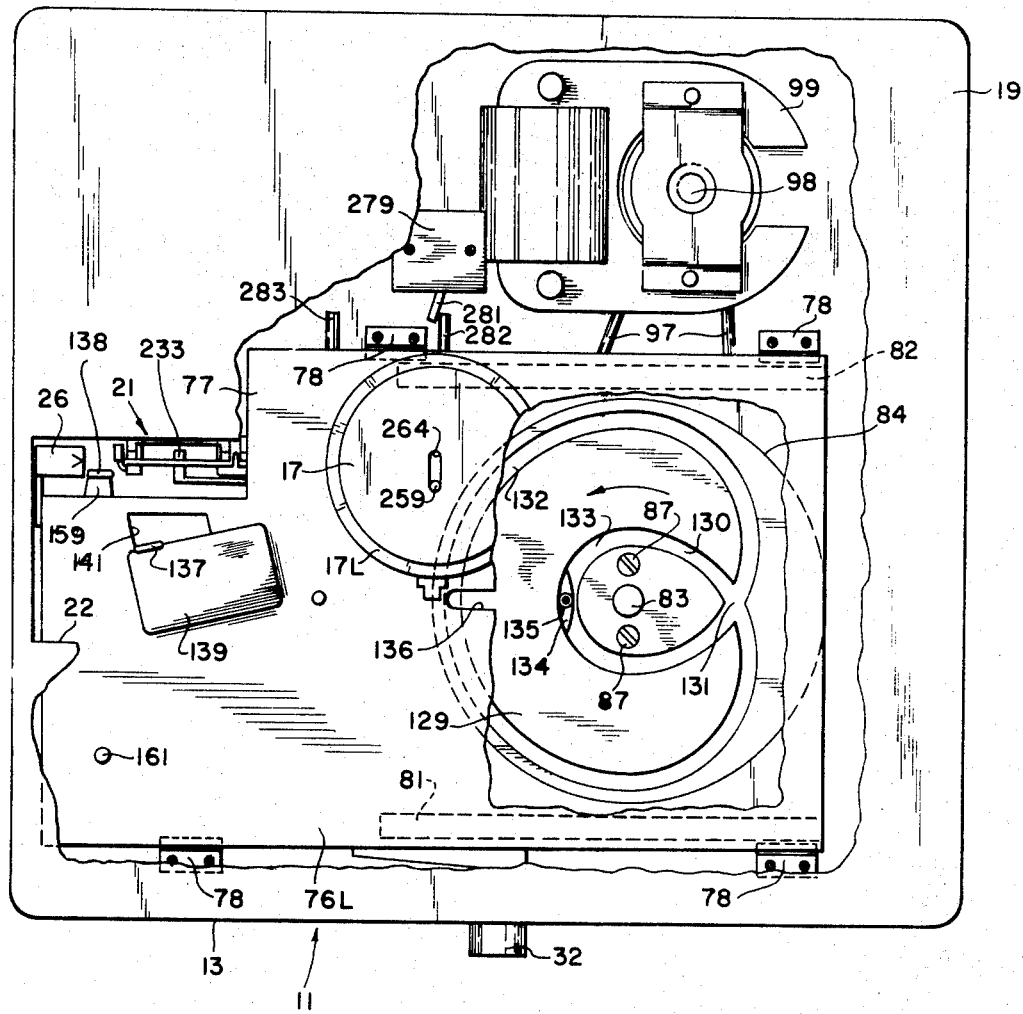
FIG. 7 is a plan view of the projector partially broken away to depict the drive motor, the tray positioning carriage and the cam means by which the carriage is moved to its two operative positions.
Figure 8:
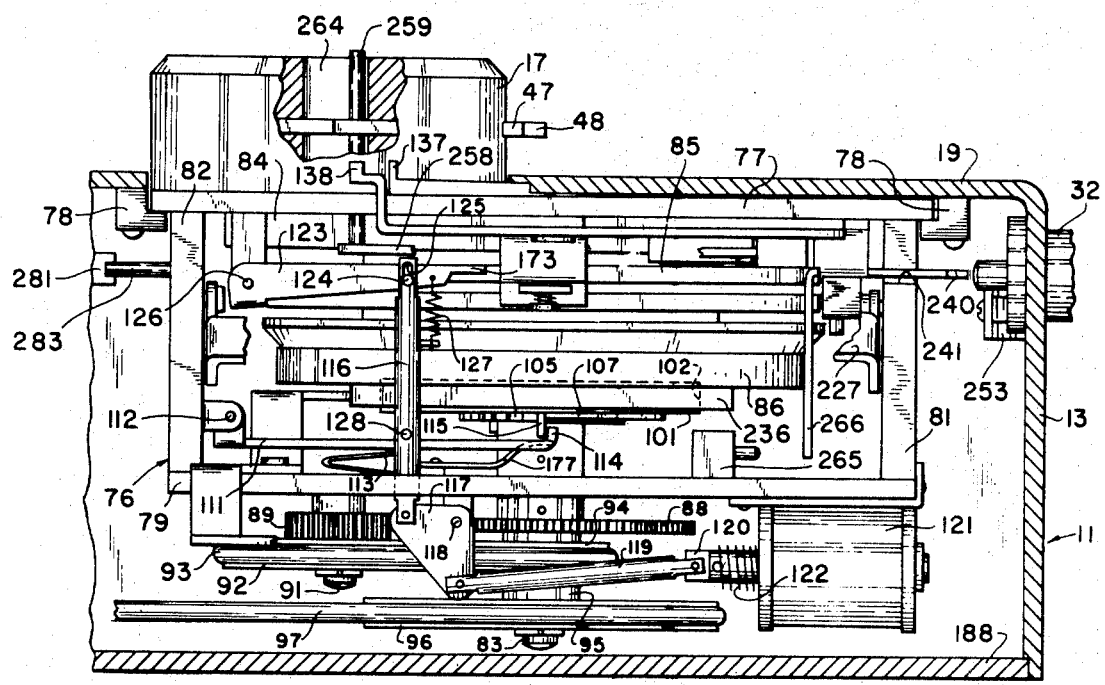
FIG. 8 is a fragmentary partially cross sectioned left side elevational view of the projector of FIG. 7 illustrating the mechanism incorporated in the tray positioning carriage, other mechanisms of the projector being omitted for purposes of clarity.

A mechanism carriage, designated generally by numeral 76, is located within the projector housing and is best illustrated in FIG. 7 and 8 of the accompanying drawings. The carriage comprises a top plate 77 which carries spindle 17 and positioning pin 73 (see FIG. 5) and which is slidably supported against the top wall member 19 of the projector housing by gib member 78. A bottom plate 79 is rigidly supported below and in parallel relation to top plate 77 by front and rear wall members 81 and 82 and thus is movable with the top plate as a unit as the carriage slides to the right or left to effect corresponding lateral movement of the slide tray.

Camshaft Assembly and Drive Mechanism

A vertical camshaft 83 is rotatably supported by the top and bottom plates 77 and 79 of the carriage and is provided with an upper cam member 84, an intermediate cam member 85 and a lower cam member 86. The three cam members are connected in fixed relation to each other by a pair of screws 87, thereby providing a unitary cam assembly which is rotatable relative to the camshaft.

Below bottom carriage plate 79, a spur gear 88 is pinned to the camshaft and is meshed with a smaller spur gear 89, which is freely rotatable on its support stud 91 and provided with an integral pulley 92. A belt 93 connects pulley 92 with the smaller sheave 94 of a double sheave pulley 95, which is likewise freely rotatably on camshaft 83. The larger sheave 96 of pulley 95, in turn, is connected by belt 97 to armature shaft 98 of drive motor 99. Thus, the camshaft 83 is driven continuously in a counterclockwise direction by motor 99 but revolves much slower than the motor shaft and with much more torque.

Figure 9:
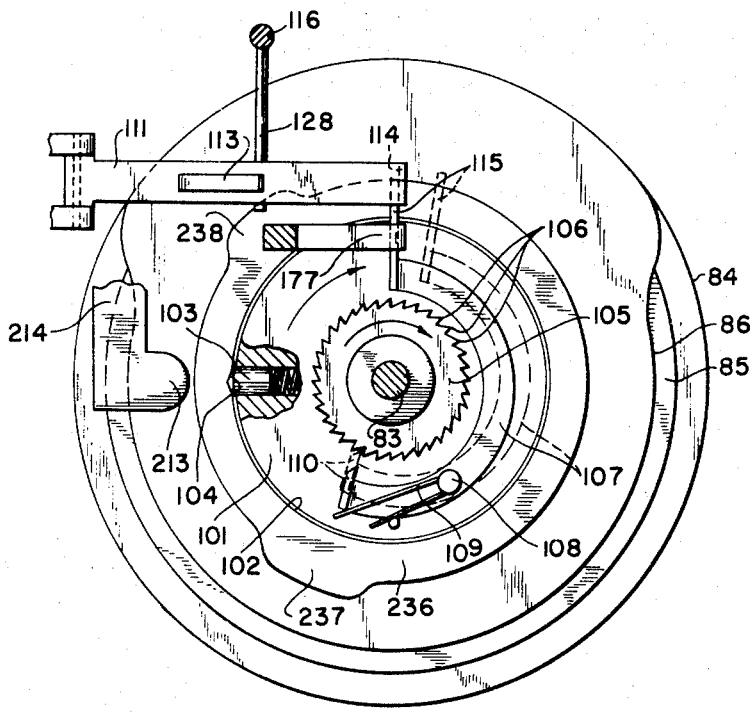
FIG. 9 is a bottom view of the cam assembly embodied in the tray positioning carriage.

A flat circular torque limiting clutch disc 101 is received in a corresponding recess 102 in the lower cam member 86 as shown in FIGS. 8 and 9 and is provided with a spring loaded detent plunger 103 adapted to engage a notch 104 in the edge of recess 102. Accordingly, the cam assembly can be driven by disc 101 but the amount of torque that can be transmitted is limited by the force required to cam plunger 103 out of engagement with notch 104; thereby preventing slide or projector damage which might otherwise occur if rotation of the cam assembly were accidentally blocked as a result of a malfunction of the machine.

A clutch collar 105 is pinned to camshaft 83 and is provided with a plurality of peripheral teeth 106 adjacent the lower surface of disc 101. As previously mentioned, the camshaft rotates continuously in a counterclockwise direction as viewed from the top and therefore drives the affixed clutch collar in the same direction, i.e., in a clockwise direction as viewed from the bottom in FIG. 9.

To perform each slide changing operation, the cam assembly must be rotated through a single complete revolution. Accordingly, the drive mechanism includes a single revolution clutch comprising a dog member 107, which is pivotally supported to disc 101 by pin 108 and biased by hairspring 109 to urge dog tooth 110 toward engagement with the peripheral teeth 106 of the clutch collar 105. A clutch operating lever 111 is pivotally supported to rear wall member 82 of the carriage by a pin 112 and is biased upwardly by a leaf spring 113 to the raised position depicted in FIG. 8. In that position, lip 114 projecting upwardly from lever 111 is located in the circular path of movement of lip 115 at the end of the dog member 107 substantially opposite tooth 110. Therefore, lip 114 engages lip 115 and holds the dog tooth 110 out of engagement with clutch collar 105 as a result of the slight torque frictionally imparted to the cam assembly by camshaft 83 and clutch collar 105; thus allowing the cam assembly to remain stationary as the camshaft rotates.

Vertical operating rod 116 extends upwardly through a hole in the bottom carriage plate 79 and is pivotally connected at its lower end to a bell crank member 117, which is pivoted to a depending flange on the bottom plate of the carriage by pin 118 and connected by link rod 119 to the armature 120 of a solenoid 121 mounted to the carriage. A light coil spring 122 encircling the solenoid armature urges the armature toward the bell crank member 117 and thereby resiliently maintains the vertical operating rod 116 in its depicted raised position. The bifurcated upper end of rod 116 is pivotally attached to control arm 123 by pin 124 extending through opposed elongate rod slots 125. The control arm 123, in turn, is pivotally mounted to an extension on the plate 77 of the carriage by pivot pin 126. A coil spring 127 connects the control arm with rod 116 and resiliently maintains pin 124 in contact with the lower ends of slots 125 as shown in FIG. 8. When the operator energizes the solenoid by depressing either button 28 or 31 on the remote control unit, the resulting retraction of the solenoid armature 120 causes the vertical operating rod 116 to move downwardly. When this occurs, clutch operating pin 128 projecting horizontally from the operating rod depresses clutch operating lever 111 and disengages its lip 114 from the dog member 115, which then moves into engagement with the clutch collar 105 to couple the cam assembly directly to the camshaft 83. If the solenoid 121 is energized only momentarily to effect each cam changing operation, clutch operating lever 111 will have returned to its raised position by the time the cam assembly completes a single revolution and will therefore again engage dog member 107 to release the dog tooth 110 from the clutch collar 105, thereby arresting rotation of the cam assembly at its initial position. If a malfunction should occur which causes disc 101 to slip relative to the cam assembly by disengagement of the detent 103,104, the initial relation of the disc to the cam assembly will be restored during the subsequent slide changing operation after the cause of the malfunction has been corrected.

Carriage Shifting Mechanism

As previously mentioned, each slide changing operation involves moving the slide tray laterally to its opposite position in order that successive slides can be projected from alternate slide gates. Since the slide tray is located relative to the projector by means of spindle 17 carried by the mechanism carriage, the entire carriage is therefore shifted alternately to the left and then to the right in response to successive complete revolutions of the cam assembly. To perform this function, the top face 129 of the upper cam member 84 is provided with a continuous cam slot 130, depicted in FIG. 7, which crosses itself as shown at numeral 131 to provide an arcuate outer cam track 132 and an arcuate inner cam track 133. A boat shaped cam follower 134 is received in cam slot 130 and is pivotally supported by a support stud 135, which is rigidly secured to the top wall member 19 of the projector housing and extends freely through an elongate slot 136 in top plate 77 of the carriage. When the cam assembly is positioned as shown in FIG. 7, between slide changing operations, the cam follower member is located at the midpoint of the inner cam track 133 which is substantially diametrically opposed from point 131, and therefore maintains the carriage 76 at its left position to locate the slide tray in the corresponding position shown at 16L in FIGS. 1, 2, and 5. During the next complete counterclockwise revolution of the cam member 84, cam follower 134 pivots about stud 135 as it follows the profile of the cam slot 130 and passes through the slot crossing 131. Since the cam follower support stud 135 cannot move relative to the projector housing 19, the rotation of the cam assembly causes the entire carriage 76 to shift to the right. When the cam assembly has completed a single revolution, follower 134 is therefore located at the midpoint of the outer cam track 132 which is substantially diametrically opposed from point 131, and thus locates the slide tray in its right position as shown at 16R in FIG. 5. Hence, by alternately following the inner and outer cam tracks 133,132 respectively, the cam follower 134 causes the slide tray 16 to be shifted laterally to its opposite position during each slide changing operation. As the carriage 76 moves between its two alternate positions, the distance between shaft 98 of motor 99 and pulley sheave 96 obviously changes somewhat, but by locating the motor with its shaft behind the intermediate position of the camshaft, as shown in FIG. 7, this distance variation can be readily accommodated by stretching of the resilient drive belt 97.

Tray Indexing Mechanism

The tray indexing mechanism, shown in detail in FIGS. 10 through 14, includes a tray indexing pawl 137 and a tray locating pawl 138, which are adapted to engage the slide tray member 34 by entering between two adjacent indexing lugs 41 thereof.

The tray indexing pawl 137 projects upwardly from a pawl plate 139, which is supported by top plate 77 of carriage 76 above opening 141 in that plate. Below top plate 77 of the carriage, indexing lever 142 is pivotally supported thereto by a pivot stud 143. A tongue 144 on the indexing lever is provided with a cam follower pin 145 received in endless cam slot 146 in the upper face of intermediate cam member 85, whereby rotation of the cam assembly affects angular movement of the indexing lever 142 between its extreme counterclockwise and clockwise positions shown respectively in FIGS. 13 and 14. Pawl engaging slide 147 is slidably supported immediately below indexing lever 142 by means of studs 148 projecting downwardly from the top plate 77 of the carriage 76 through elongate slide slots 149. A cam follower tongue 151, described in detail below, is movably supported at the end of the slide plate 147 adjacent intermediate cam member 85 and is maintained adjacent one of the two peripheral cam surfaces 152 and 153 of cam member 85 by spring 154. As the cam assembly rotates, the slide plate 147 is therefore moved laterally between its right and left positions shown respectively in FIGS. 13 and 14.

Pawl plate 139 includes a guide lug 155 projecting downwardly therefrom through opening 141 in the top plate 77 of the carriage, through elongate slot 156 in indexing lever 142 and through arcuate slot 157 in pawl engaging slide 147. A large headed screw 158 is threaded into the lower end of lug 155 and overlaps the edges of arcutat slot 157, thereby preventing pawl plate 139 from moving upwardly. Thus, the position of the tray indexing pawl 137 is established by elongate slot 156, which is located in generally radial relation to the circular row of slide tray indexing lugs 41 and controls latent movement of pawl 137, and by elongate slot 157, which is substantially concentric with the row of indexing lugs and controls radial movement of pawl 137.

Figure 14:
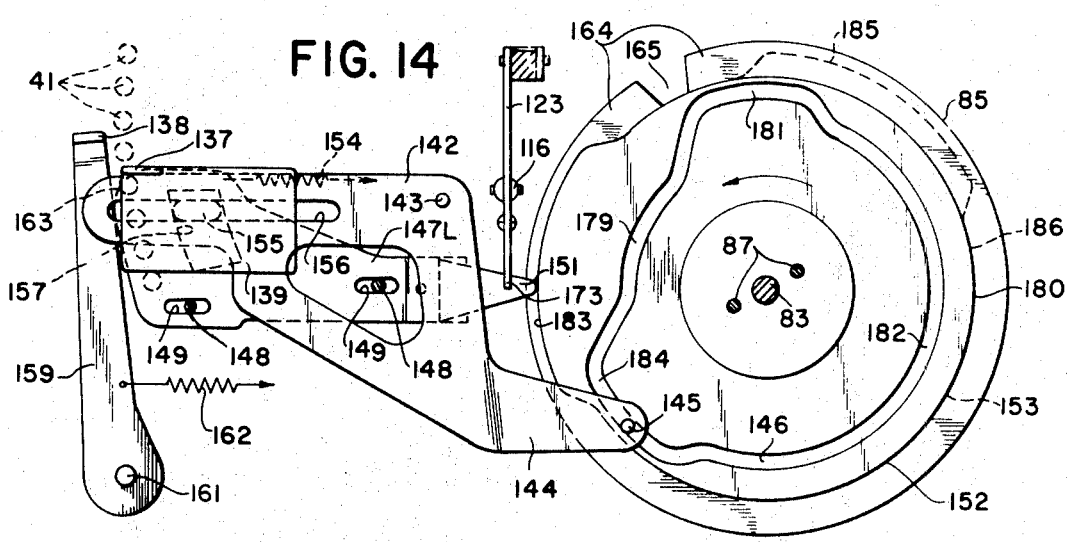
FIG. 14 is a view similar to FIG. 13 showing the slide indexing elements in the respective positions which they assume as the tray is being indexed in a counterclockwise direction during a slide changing operation.

Tray locating pawl 138 projects upwardly from the right free end of pawl arm 159 which is pivotally attached to the top plate 77 of the carriage in horizontal alignment with pawl engaging slide 147 by stud 161. A spring 162 biases the pawl arm 159 in a clockwise direction to maintain it in resilient engagement with the adjacent curved end surface 163 of the pawl engaging slide 147. Therefore, when slide 147 is in its right position between slide changing operations as seen in FIG. 10, tray locating pawl 138 is received between two adjacent tray indexing lugs 41 to prevent the tray member 36 from rotating and tray indexing pawl 137 is maintained in an inoperative position beyond engagement with the tray indexing lugs. When the pawl engaging slide 147 moves to the left during a slide changing operation, as shown in FIG. 14, it displaces pawl arm 159 to withdraw the tray locating pawl 138 from the tray indexing lugs 41 as the tray indexing pawl 137 is received between two of those lugs.

The upper and lower peripheral cam surfaces 152, 153 respectively of intermediate cam member 85 are separated by annular flange 164 provided with a slot 165, which is located in alignment with cam follower tongue 151 when the cam assembly is in its initial position shown in FIGS. 10 through 13. By reference to FIGS. 11 and 12, it will be apparent that the cam follower tongue 151 includes an ear 166 which fits loosely through a slot 167 in the vertical portion 168 of pawl engaging slide 147. A rivet 169 is secured to the horizontal portion 170 of the pawl engaging slide and extends freely through a hole 171 in ear 166. A light coil spring 172 is compressed between ear 166 and the head of rivet 169, thereby biasing the ear against the lower surface of the horizontal portion 170 of the slide 147 to resiliently hold the tongue in its raised position in alignment with the upper cam surface 152, as shown in FIGS. 10 and 11. When the tongue 151 is depressed to its lower position shown in broken lines in FIG. 11, however, its tip is aligned with the lower cam follower surface 153 below flange 164 of cam member 85. Control arm 123 is provided with an elongate tip 173 which is located immediately above tongue 151 and which depresses the tongue to its lower position whenever solenoid 121 is energized.

Figure 24:
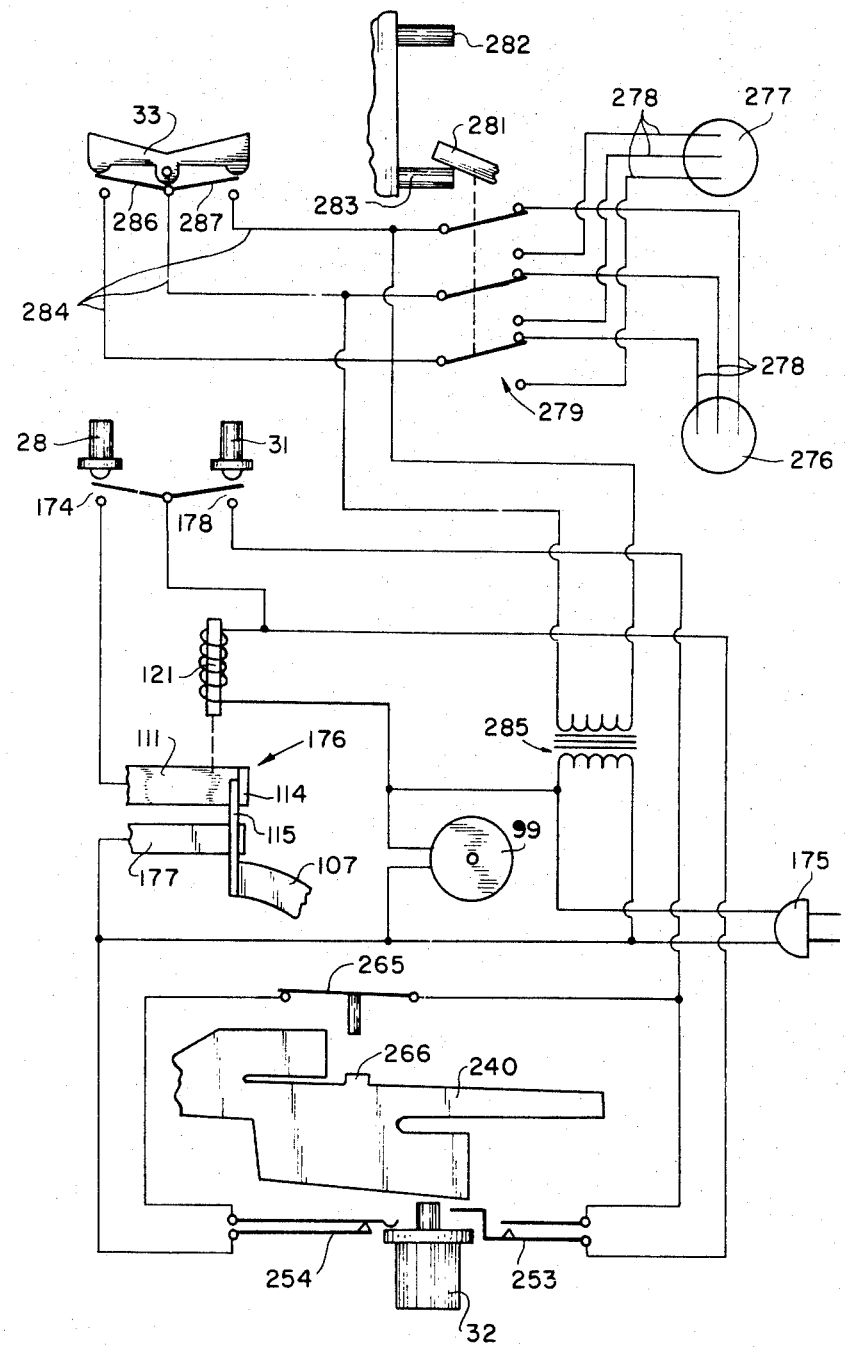
FIG. 24 is a schematic wiring diagram of the projector.

By reference to the schematic wiring diagram of FIG. 24, it will be seen that depression of the "forward" button 28 of remote control unit 29 closes a normally open switch 174, which connects the solenoid with power supply plug 175 through a normally closed momentary contact switch 176. The latter switch comprises clutch operating lever 111 and lip 115 of dog member 107, which engages conductor strap 177 as shown in FIGS. 8, 9, and 24. When the cam assembly is in its initial position, between slide changing operations, lip 114 of lever 111 is in contact with lip 115 of the dog member, which in turn is in contact with conductor strap 177. Accordingly, current can flow through the closed switch from lever 111 to strap 177. When the operator closes switch 174, the resulting energization of solenoid 121 engages the cam drive clutch and simultaneously moves tongue 151 downwardly through flange slot 165 to its lower position. Since lip 114 of the clutch operating lever 111 thereupon releases lip 115 of the dog member 107, the latter is moved instantly into engagement with clutch collar 105 by spring 109, as shown in broken lines in FIG. 9, thus disengaging lip 115 from conductor strap 177 to open switch 176. Consequently, solenoid 121 is immediately de-energized to allow tongue 151 to return to its raised position through slot 167 before the cam assembly has moved that slot beyond the tongue. Reverse button 31 of the remote control unit is similarly adapted to close a normally open switch 178, which is connected directly in series with power supply plug 175 and solenoid 121. When this button is depressed, tongue 151 is therefore moved to its lower position in the same manner just described and the cam assembly simultaneously starts to rotate. Since switch 178 remains closed until button 31 is manually released, the time required for the operator to depresses and release the button in a normal manner therefore allows the cam rotation to move slot 167 beyond tongue 151 before solenoid 121 is de-energized; thus trapping the tongue below flange 164 in alignment with the lower cam surface 153. If desired, a delayed action relay or the like, not shown, can also be included in the reverse operation circuit to insure that even a substantially instantaneous depression and release of button 31 will cause solenoid 121 to remain energized until flange slot 167 has moved beyond tongue 151.

Forward Operation

The sequence of operation involves in indexing and shifting the slide tray 16 in response to depression of the "forward" button 28 can best be understood by referring to FIGS. 13 and 14 in conjunction with FIG. 25, which shows diagrammatically the correlation between the timing of various operations performed by the projector in its forward mode of operation.

Whenever the cam assembly is in its initial position, cam follower pin 145 of indexing lever 142 is located along the innermost track segment 179 of cam slot 146 in intermediate cam member 85, thereby locating the indexing lever in its extreme counterclockwise position shown in FIG. 13. Concurrently, tongue 151 is aligned with the inner arcuate surface 180 of the upper cam surface 152 of cam member 85, thereby maintaining the tray indexing pawl 137 beyond engagement with the tray indexing lugs 41 and allowing tray locating pawl 138 to be received between two of the tray lugs 41. As cam member 85 rotates in a counterclockwise direction, cam follower pin 145 moves outwardly relative to the camshaft 83 as it enters the outermost cam track segment 181 and then returns to an intermediate position as it enters the intermediate cam track segment 182. Accordingly, indexing lever 142 moves from its initial extreme counterclockwise position to its extreme clockwise position shown in FIG. 14 and then returns to an intermediate position between the two positions shown in FIGS. 13 and 14. During such movements of the indexing lever 142, however, the raised tongue 151 of the pawl of engaging slide 147 remains in alignment with the inner arcuate surface 180 of cam member 85 so that the tray indexing pawl 137 remains in its inoperative position and has no influence on the immobilized slide tray member 34.

While the cam assembly continues to rotate, the upper cam member 84 causes the carriage 76 and the slide tray 16 to shift to their respective opposite positions. When the shifting of the slide tray is complete, cam lobe 183 on the upper cam surface 152 of cam member 85 comes into alignment with tongue 151 while indexing lever 142 is still located in its intermediate position. Thereupon, pawl engaging slide 147 is moved to the left in opposition to spring 154 to introduce pawl 137 between the adjacent pair of tray indexing lugs 41 as pawl 138 is simultaneously disengaged from the tray indexing lugs. The other outermost cam track segment 184 of cam slot 146 then moves into alignment with pin 145 on indexing lever 142, thus causing the latter to move from its intermediate position to its extreme clockwise position, to dwell there momentarily and then to move back to its extreme counterclockwise position as the cam assembly completes its rotation. Thus, after the slide tray 16 has been shifted, the tray member 34 is retracted in a clockwise direction by one compartment increment, allowed to remain momentarily in that position, and then advanced in a counterclockwise direction by two compartment increments to complete the slide changing cycle.

In the event the cam assembly were to be accidentally jammed with tongue 151 located above flange 164, thereby causing the drive clutch 103, 104 to slip solenoid 121 could not effect subsequent depression of clutch operating lever 111 if vertical operating rod 116 were positively connected to control arm 123. Under these circumstances, however, and by virtue of elongated slot 125 which permits relative movement between arm 123 and rod 116, the solenoid 121 is sufficiently powerful to move rod 116 downwardly by stretching spring 127, thereby allowing the clutch operating lever 111 to be released from dog member 107 notwithstanding the fact that the control arm 123 is blocked against downward movement by cam follower tongue 151.

Reverse Operation

When the counterclockwise rotation of the cam assembly is initiated by depression of reverse button 31, the resulting angular movement of the indexing lever 142 and the shifting movement of the slide tray 16 take place in exactly the same manner and sequence described above but the lateral movement of the pawl engaging slide 147 is controlled by the lower cam surface 153 of cam member 85, rather than by the upper cam surface 152. As shown in FIGS. 13 and 14, lower cam surface 153 is substantially identical in profile to the upper cam surface but is rotationally displaced therefrom so that tongue 151 is engaged with lower cam lobe 185 while the outermost track segment 181 of cam member 85 is engaged with cam follower pin 145. Therefore, with reference to FIG. 13, the initial rotation of the cam assembly causes the tray member 34 to be retracted or moved in a counterclockwise direction by two compartment increments, allowed to dwell in that position, and then advanced by one compartment increment and re-engaged by pawl 138 as the inner arcuate cam segment 186 rotates into alignment with tongue 151. During the subsequent continuing rotation of the cam assembly, the tray 36 is shifted and the indexing lever 142 then moves again as follower pin 145 enters and leaves cam track segment 184 of cam member 85. The latter movements of the indexing lever have no influence on the tray member, however, due to the fact that the pawl engaging slide 139 remains in its right position and thereby maintains tray indexing pawl 137 out of engagement with tray lugs 41.

Slide Gate Structure

Figure 15:
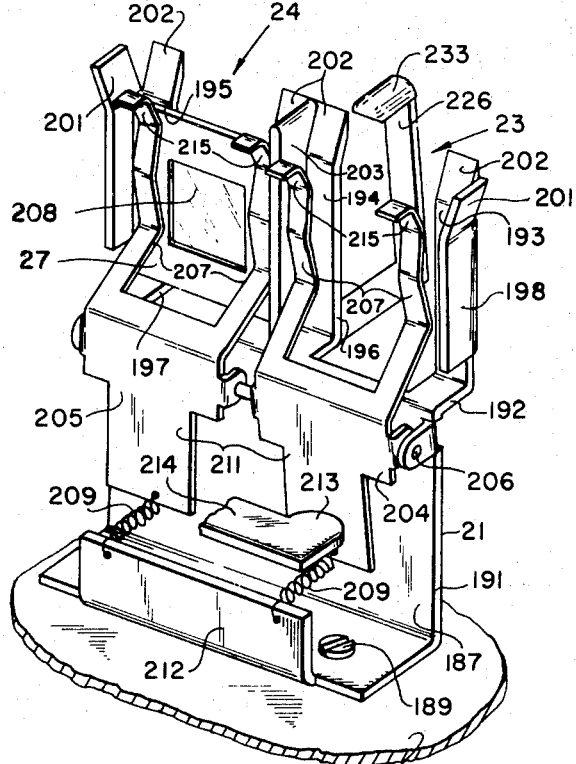
FIG. 15 is a perspective rear view of the slide gate structure embodied in the projector.
Figure 16:
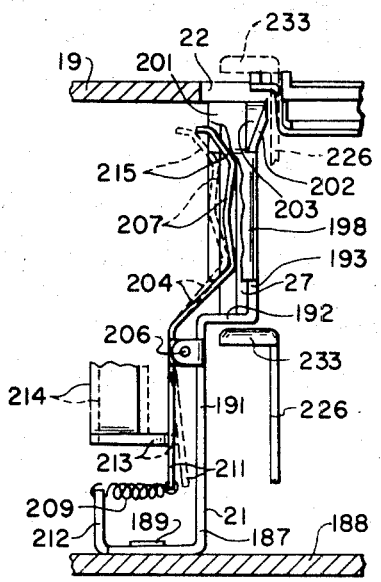
FIG. 16 is a side elevational view of the slide gate structure shown in FIG. 15.

The two slide gates 23 and 24 are provided by the slide gate structure 21, shown in FIGS. 15 and 16, which comprises a frame plate 187 rigidly attached to the base plate 188 of the projector housing by screws 189. Above its vertical lower portion 191, the frame plate is bent forwardly and then upwardly to provide a horizontal shelf section 192 and vertical front wall sections 193, 194 and 195, which are separated by openings 196 and 197 extending into the shelf section. Rearwardly projecting end wall members 198 and 199 are carried respectively by the front wall sections 193 and 195 and are provided with outwardly sloped upper ears 201 corresponding to the forwardly sloped upper end portions 202 of the front wall sections. A separator bar 203 extends upwardly along the back of the central front wall section 194 and is spaced from both end wall members by a distance just slightly more than the width of a slide 27. Accordingly, a slide located behind either of the two front wall openings 196 or 197 rests on shelf section 192 and is laterally positioned between separator bar 203 and the corresponding end wall member 198, 199.

To insure that slides in the film gates are maintained in contact with the corresponding rearward surfaces of the front wall sections and will be positioned in proper relation to the respective lens systems, two pressure members 204 and 205 are pivotally supported to frame plate 187 rearwardly of the corresponding slide positions by hinge pin 206. Each of the pressure members includes two fingers 207 adapted to engage the marginal rearward faces of a slide 27 received in the corresponding slide gate without obstructing the central slide transparency 208 thereof. Light coil springs 209 connecting the lower tongues 211 of the pressure plates to stationary ear 212 of frame plate 187 bias fingers 207 forwardly into resilient engagement with the corresponding slides. As explained in greater detail below, the nose portion 213 of a gate opening lever 214 supported by carriage 76 is adapted to press forwardly on tongues 211 in alternate sequence and in timed relation to the slide changing operations to alternately open the gates by retracting the corresponding pressure plate fingers 207 as shown at the empty gate 23 in FIG. 15 and in broken lines in FIG. 16. When either of the gates is in this open condition, a slide 27 allowed to drop into that gate from slide tray 16 through housing opening 22 is therefore guided into its projection position by the sloped ears 201 and 202 of the frame plate 187 and by the rearwardly sloped upper ends 215 of fingers 207 before it is engaged by the fingers to seat it firmly against the corresponding front wall sections.

Optical System

Figure 6:
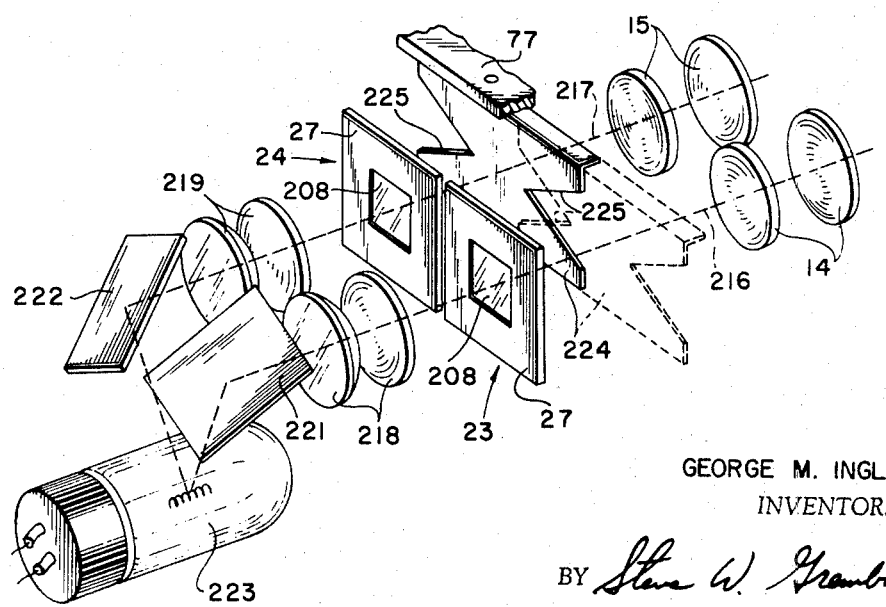
FIG. 6 is a somewhat diagrammatic perspective rear view of the optical elements of the projector.

Referring again to FIGS. 5 and 6, the two illustrated slides 27 in gates 23 and 24 are shown in their respective projection positions which they assume while supported in the corresponding left and right slide gates 23 and 24. The previously mentioned objective lens assemblies 14 and 15 are located forwardly of the illustrated slides with their respective stationary parallel optical axes 216 and 217 passing through the centers of the corresponding slide transparencies 208 in normal relation thereto. As illustrated in FIG. 23 and described later in detail, the objective lens assemblies are adjustable independently along their respective axes, thereby allowing both lens systems to focus images of their respective slides within substantially the same area on a remote projection screen.

To illuminate simultaneously the transparencies 208 of the slides located in both gates, two condenser lens systems 218 and 219 are located along the respective optical axes 216 and 217 rearwardly of the slides 27. Mirrors 221 and 222 are mounted diagonally behind the respective condenser lens systems 218 and 219 by appropriate support means and are tilted toward the filament of projection lamp 223 so that each mirror reflects light from the lamp to the respective condenser lens system, thereby illuminating the corresponding slide transparency. Other types of illumination systems could of course be employed, for example one utilizing a single horizontal cylindroid condenser lens system adapted to provide a single light beam of sufficient width to illuminate both slide transparencies at once.

Closely behind the two objective lens assemblies 14, 15, a mask member 224 is carried by the top plate 77 of carriage 76. When the carriage is in its right position, mask member 224 is located in front of slide 27 in slide gate 24 and therefore prevents the image of that slide from being projected onto the projection screen. As the carriage 76 and slide tray 16 shift to the left during a slide changing operation, mask member 224 likewise shifts to the position shown in broken lines in FIG. 6 so that only the image of slide 27 in slide gate 24 is then visible on the screen. It should be noted, however, that during the shifting movement of the mask member 224, its V-shaped end notches 225 gradually uncover one slide and simultaneously gradually obstruct the other one so that the projected image of the preceding slide fades in intensity as the image of the next slide brightens into view at the same location on the screen; thus presenting a pleasing uninterrupted transition between successive images. After each previously displayed slide has been replaced in the gate, each subsequent shifting movement of the carriage obviously causes the same lap dissolve effect to be repeated.

Slide Transfer Mechanism

Figure 17:
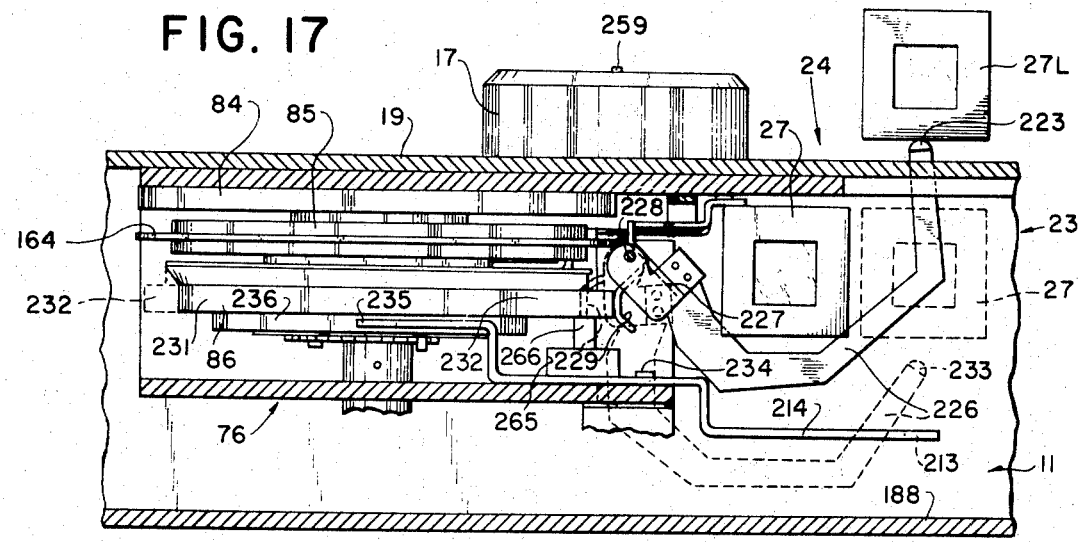
FIG. 17 is a fragmentary, partially cross sectioned rear elevational view of the projector showing the operative elements of the slide transfer and gate opening mechanisms therein.
Figure 18:
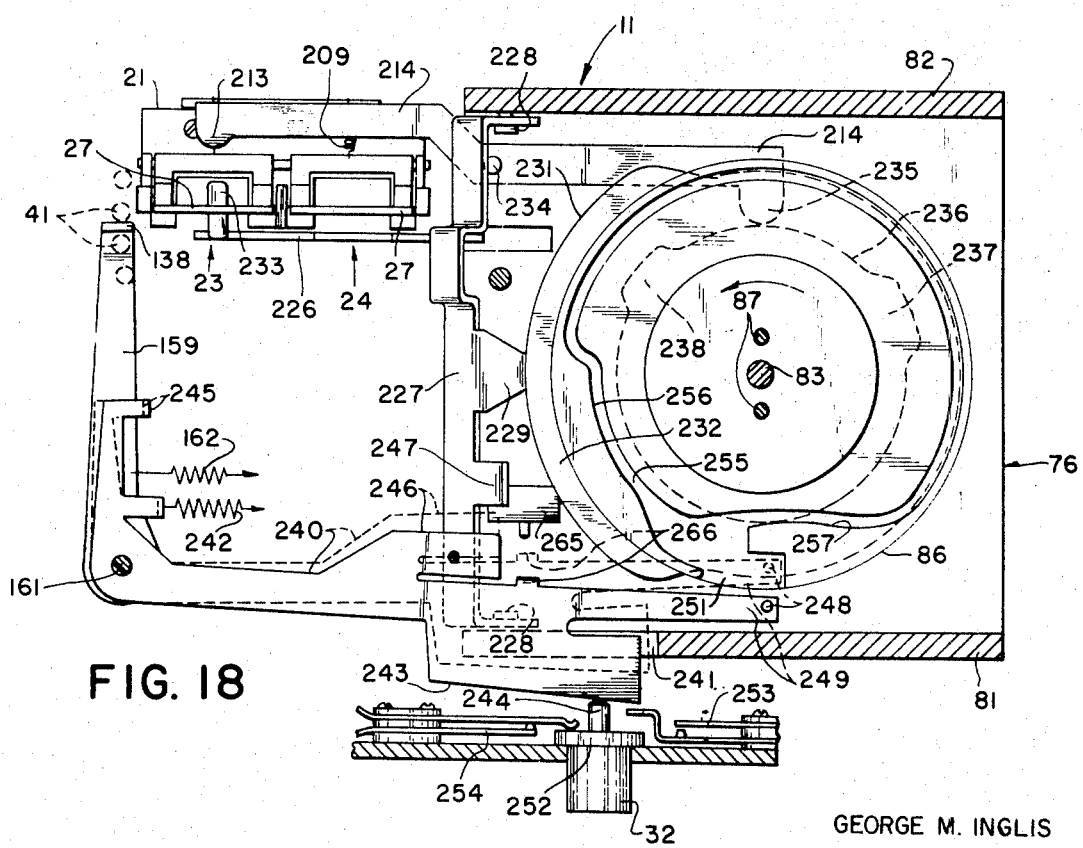
FIG. 18 is a fragmentary, partially cross sectioned plan view of the gate opening, slide transfer and select release mechanisms of the projector, showing the illustrated elements of those mechanisms in the respective positions which they normally assume between slide changing operations.

The mechanism employed to lower slides from the slide tray into the slide gates and to return the slides from the gates into the tray is best shown in FIGS. 15 through 19. This mechanism comprises a lifter arm 226 located just ahead of the slide gate structure and rigidly connected to a cross bar 227, which is pivotally supported between the front and rear members of the carriage by pivot studs 228. A cam follow finger 229 carried by cross bar 227 is adapted to ride against the periphery of slide loading cam 231 of the lower cam member 86 as best seen in FIGS. 18 and 19. When the cam assembly is in its initial position, lobe 232 of cam 231 is engaged with cam follower finger 229 and thereby causes the lifter arm to assume its raised position shown in solid lines in FIGS. 15 and 17. In this position, lifter pad 233 at the upper end of arm 226 is received in arcuate opening 63 in the slide tray disc 51 to support the slide aligned with opposed disc notches 64. Therefore, as long as the lifter arm remains in its raised position, the slide tray 16 can be indexed but none of the slides 27 can drop out of their respective tray compartments.

As the rotation of the cam assembly moves lobe 232 beyond cam follower finger 229, arm 226 drops to its lowered position shown in solid lines in FIG. 16 and in broken lines in FIG. 17. Accordingly, as the lifter pad moves downwardly through opening 196 or 197 in the slide gate structure, the slide aligned with disc notches 64 drops into projection position in the corresponding gate, which is temporarily held open as described below. As will be evident from FIGS. 25 and 26, this slide loading operation occurs after the cam assembly has rotated sufficiently to produce the initial tray indexing movement required during the projector's reverse mode of operation, but before the tray 16 and carriage 76 have shifted laterally. By the time the tray shifting operation commences, lifter pad 233 is therefore positioned below shelf section 192 of the gate structure so that the lifter arm 226 can move sideways with the carriage to position the lifter pad below the slide located in the opposite projection gate. After the tray shifting operation is completed, lobe 232 of cam 231 again moves into alignment with cam follower finger 229, thus causing the lifter pad 233 to raise that slide out of the gate and back into its slide tray compartment. Thereupon, the lifter pad remains in its raised position as the cam assembly completes the final portion of its revolution during which it effects the tray indexing function performed when the projector is adjusted to its forward mode of operation.

Gate Opening Mechanism

As the lifter pad moves downwardly to load a slide into the corresponding slide gate, that gate must be opened by retracting its fingers 207 in order that the slide can fall freely into projection position solely by virtue of gravity. Concurrently, the opposite slide gate obviously must remain in closed condition to avoid disturbing the projected image of the slide in that gate. These functions are performed by the previously mentioned gate opening lever 214 as best seen in FIG. 18 which is pivotally supported to the bottom plate 79 of carriage 76 by pivot stud 234 and therefore moves with the carriage so that its nose portion 213 is engageable with the pressure member tongue 211 of the slide gate in which a slide is to be replaced. The end of gate opening lever 214 opposite its nose portion 213 is provided with a cam follower nose 235 positioned adjacent the periphery of gate opening cam 236 at the bottom of lower cam member 86. Between slide changing operations, the gate opening lever 214 is free to move slightly out of contact with the adjacent pressure member tongue 211 and therefore has no influence on the pressure with which the corresponding slide is engaged by fingers 207. As the cam assembly rotates, however, lobe 237 of cam 236 engages and displaces cam follower nose 235 of lever 214 so that its opposite nose portion 213 presses against the adjacent pressure member tongue 211 to open the corresponding slide gate as shown in FIG. 15. This occurs just before the lifter arm 226 moves downwardly in order that the slide can fall freely into place in the open gate. Thereupon, the continuing rotation of the cam assembly moves lobe 237 beyond cam follower nose 235 so that the slide is resiliently engaged and held in proper projection position by the corresponding fingers 207.

After the mechanism carriage has shifted, nose 213 of lever 214 is aligned with the pressure member tongue 211 of the other slide gate, from which the previously displayed slide is returned to its tray compartment by upward movement of lifter arm 226. As that slide commences its upward movement, the corresponding fingers 207 continue to hold it against the adjacent front wall surfaces of the slide gate structure so that the slide is guided into the slide tray compartment directly above disc notches 64. Before the slide has been lifted entirely into the slide tray, however, cam lobe 238 of cam 236 displaces lever 214 in the same manner previously described, thus temporarily opening the gate to release the slide as it completes its upward movement into its tray compartment.

Select-Release Mechanism

During the previously described forward and reverse modes of operation of the projector, one slide 27 is always located in a slide gate and the slide tray 16 is prevented from rotating by tray locating pawl 138 except during a slide changing operation. Therefore, if the operator wishes to rotate the tray member 34 manually, either to skip certain slides in the display sequence or to return the tray to its initial position for removal, the tray locating pawl 138 must be released, but only after the slide in the projector has been returned to its proper tray compartment. After lifter arm 226 has removed the slide from the projector, it must then remain in its raised position while the tray locator pawl is released so that a slide cannot drop through notch 64 in the tray disc as the tray is rotated. Furthermore, to insure that the slide tray 16 cannot be removed from the projector unless all of the slides have been returned to their respective compartments, the select-release mechanism is also adapted to retract locking tongue 47 after completing its other functions, thereby allowing the slide tray to be removed when it has been rotated to align its notch 49 with the narrow tongue tip 48 still protruding beyond tray spindle 17.

To perform the foregoing operations, the select-release mechanism illustrated in FIGS. 18 and 19 comprises a disabling lever 240 pivotally supported above pawl arm 159 by stud 161 and projecting through a slot 241 in the front wall member 81 of carriage 76. A spring 242 biases the disabling lever 240 in a clockwise direction to its inoperative position, shown in solid lines in FIG. 18. Edge surface 243 of lever 240 is aligned with the central projection 244 of select-release button 32 and therefore resiliently urges that button to its extended position. When lever 240 is in its inoperative position, its depending lip 245 is disengaged from contact with the adjacent edge of pawl arm 159, its lifter blocking ear 246 is out of alignment with lifter blocking tongue 247 on lifter cross bar 227 and its cam follower pin 248 carried by finger 249 is located beyond the periphery of the adjacent upper portion of lower cam member 86. Consequently, as long as the disabling lever 240 remains in that position, it has no effect on the previously described operation of the projector.

When the operator depresses pushbutton 32, it engages and moves lever 240 so that cam follower pin 248 enters peripheral opening 251 of cam member 86 and assumes the position shown in broken lines in FIG. 18. As the cam follower pin arrives at that position, flange 252 of pushbutton 32 engages and closes a normally open select-release operating switch 253 wired in parallel with reverse switch 178 (see FIG. 24), thereby initiating rotation of the cam assembly in the same manner as if reverse button 31 had been depressed. A normally closed forward disabling switch 254 wired in series with forward switch 174 is similarly opened by the initial movement of pushbutton 32 to insure that the forward mode of operation of the projector cannot be initiated accidentally when the cam follower pin 248 has partially entered the peripheral cam opening 251 but before switch 253 has been closed. The sam initial movement of lever 240 also shifts lifter blocking ear 246 toward lifter blocking tongue 247, as shown in broken lines in FIG. 18, but does not quite bring the ear into overlapping alignment with the tongue.

When the cam assembly commences to rotate in response to the closing of switch 253, cam follower pin 248 is trapped in cam slot 255 in the top face of cam member 86 and is moved inwardly by cam lobe 256 to an intermediate position shown in broken lines in FIG. 19. The resulting counterclockwise movement of lever 240 brings lifter blocking ear 246 into alignment with lifter blocking tongue 247 and moves depending lip 245 toward pawl arm 159. While lever 240 is maintained in this intermediate position by cam lobe 256, the tray locating pawl 138 is disengaged from the tray lugs 41 by slide 147 and the tray member 34 is indexed to first retract it by two compartment increments and then advance it by one compartment increment, as previously described. During this phase of the normal reverse mode of operation of the projector, the slide lifter 226 would move to its lower position to load a slide into the corresponding gate during the time the tray member is in its retracted position. However, since the object of the select-release operation is to return all of the slides to their respective tray compartments, cam lobe 256 is adapted to retain lifter blocking ear 246 in overlapping alignment with lifter blocking tongue 247, as shown in broken lines in FIG. 19, until the tray member has completed its initial advancing and retracting movements. Thus, as represented in broken lines in FIG. 26, the lifter arm 226 is prevented from moving downwardly until ear 246 disengages lifter tongue 247 after the empty tray compartment has moved into alignment with notches 64. The continuing rotation of the cam assembly then shifts the tray so that its empty compartment is located above the other slide gate, whereupon the lifter arm 226 again moves upwardly to raise the slide in that gate into the empty tray compartment.

After the lifted slide has been returned to the tray, the final phase of rotation of the cam assembly causes cam lobe 257 to engage cam follower pin 248 and to move it to its innermost position, shown in solid lines in FIG. 19. When this occurs, depending lip 245 of lever 240 engages pawl arm 159 and moves tray locating pawl 138 out of engagement with the tray lugs 41 so that the tray member 34 can be rotated manually while the tray disc opening defined by notches 64 remains blocked by the raised lifter pad 233.

A link bar 258, shown in FIG. 19, is attached at one end to locking tongue 47 by a pin 259 and is connected at its other end to disabling lever 240 by rivet 261 projecting through an elongate slot 262 in the bar. Until lever 240 is moved to its innermost position by lobe 257, rivet 261 moves along slot 262 to allow the locking tongue to remain in its extended position under the influence of spring 263. Upon movement of lever 240 to its innermost position at the end of a cam rotation cycle, however, rivet 261 engages the rearward end of slot 262 and causes the tongue 47 to be retracted as illustrated in FIG. 19, whereupon the tray 16 can be removed and replaced after the tray member 34 has been rotated to its initial position. The upper end of pin 259 projects upwardly through slot 264 in tray spindle 17 as seen in FIG. 8 and extends slightly above the top surface of the spindle, thereby providing means for manually retracting the tongue in the event of a malfunction of the select-release mechanism.

After the select-release mechanism has completed its function, it is essential that the next slide changing cycle is performed in the forward mode of operation to insure that the mechanism will thereafter perform in proper operating sequence and to prevent possible damage to the projector or the slides. Accordingly, a normally closed reverse disabling switch 265 (see FIG. 24) is wired in series with reverse switch 178 and is adapted to be opened by finger 266 on lever 240 when that lever is in its final position, thus disabling pushbutton 31. When the forward pushbutton 28 is depressed, the initial rotation of the cam assembly causes lobe 257 to move beyond cam follower pin 248 so that spring 242 immediately returns the disabling lever 240 to its inoperative position before it has any influence on the normal forward mode of operation of the slide changing mechanism. Since the reverse disabling switch 265 closes automatically in response to the return movement of the disabling lever 240 to its inoperative position, either pushbutton 28 or 31 can thereafter be employed to change the slides in either forward or reverse sequence, as previously explained.

Alternate Tray Lug and Pawl Configurations

In the illustrative embodiment of the projector described above, the tray indexing lugs 41 are substantially cylindrical and are engaged by symmetrical round nosed pawls 137 and 138, which are spaced laterally from each other by the same distance as that between the centers of each of the adjacent tray lugs. Therefore, if the operator presses the select-release button and then rotates the tray member to a position in which the indexing pointer is between two adjacent reference numerals 39, both pawls can abut against the adjacent lugs and thereby jam the projector mechanism. By virtue of the torque limiting clutch mechanism built into the projector, such an occurrence cannot damage the machine, but will disable it until the operator manually rotates the tray member to its proper position and then re-cycles the slide changing mechanism to re-engage the torque limiting clutch.

To avoid the possibility of the foregoing occurrence, one of the two pawl members can be of non-symmetrical profile, as shown at 138A in FIG. 20. By this means, one pawl or the other will always engage a tray lug 41 sufficiently off center to cam the tray member to its nearest indexed position. As shown in FIG. 21, the camming influence of the pawls can be further accentuated by providing the tray member with lugs 41B of diamond shaped cross section and by making one or both pawls 137B and 138B of non-symmetrical profile. Similarly, as illustrated in FIG. 22, the same effect can also be achieved by employing trapezoidal tray lugs 41C, which are angularly disposed so that both pawls cannot be in nose-to-nose abutment with the corresponding lugs at the same time.

Lens Focusing System

As depicted somewhat schematically in FIG. 23, the objective lens assemblies 14 and 15 are mounted in respective lens tubes 267 and 268 which are slidably supported in mating cylindrical holes in lens support block 269. Each lens tube is provided with a rack segment 271 in meshing engagement with a corresponding small pinion 272 carried above a larger gear 273 on a rotatable vertical shaft 274. Gears 273, in turn, are meshed with worm gears 275 on the armature shafts of reversible focusing motors 276 and 277. Thus, depending on the direction in which they run, focusing motors 276 and 277 are adapted to move the respective lens tubes 267 and 268 forwardly or rearwardly independently of each other.

Although various types of reversible focusing motors could be employed, those illustrated are each provided with three wires 278, shown in FIG. 24, and are adapted to run in one direction or the other, depending on which of the two outer wires is connected to the central wire in series with a source of current. The two sets of wires from motors 276 and 277 are connected to a triple pole double throw switch 279 provided with an operating lever 281 adapted to be engaged by pins 282 and 283 on the rear wall member of carriage 76, as seen in FIGS. 7, 8 and 24. When the carriage is in its left position, pin 282 engages lever 281 and thereby connects the three wires from the right focusing motor 277 with a similar set of three wires 284 connected to transformer 285 through two normally open single pole switches 286 and 287 contained within remote control unit 29. When focusing bar 33 is rocked in one direction or the other, it closes the corresponding switch 286 or 287 and causes motor 277 to run in the corresponding direction, thereby adjusting lens system 15. Therefore, by watching the image being projected by that lens assembly, the operator can manipulate the focusing bar until the image is in sharp focus without disturbing the adjustment of the other lens assembly 14. When the carriage 76 has shifted to the right so that a slide is then being projected by lens assembly 14, lug 283 is engaged with switch lever 281 so that focusing motor 276 can be connected with transformer 285 through either switch 286 or 287 in the same manner just described, thus allowing that lens assembly to be independently adjusted by means of the remote control unit.

Although the invention is particularly suitable for lap dissolve slide projectors and has been illustrated and described in that context, it should be understood that various components and sub-assemblies combined in the illustrative projector are not limited to such overall combinations but may be employed advantageously in conventional slide projectors or in other types of related apparatus, either independently or in various combinations or sub-combinations with one another.

The invention has been described in detail with particular reference to an illustrative preferred embodiment thereof, but it will be understood that variations and modifications can be effected within the spirit and scope of the invention as described hereinabove and as defined in the appended claims.

I claim:

1. A slide projector adapted to be loaded with a slide tray unit including a slide tray member provided with a row of slide compartments in which respective slides are carried in generally aligned relation to one another in projection sequence, said projector comprising:
   two slide gates for receiving individual slides;
   means for projecting an image on a slide received in one of said gates and an image of a slide received in the other of said gates;
   means for shifting a slide tray unit loaded onto said projector to align said row of slide compartments thereof alternately with one of said slide gates and with the other of said slide gates, said tray shifting means comprising (1) a carriage having means for positioning said tray and (2) means for imparting reciprocal movement to said carriage; and
   slide changing means operable in timed relation with said projection means and said tray shifting means while said slide tray unit is on said projector for transferring successive ones of said slides in projection sequence from their respective slide compartments into reception by alternate ones of said slide gates and for returning each such slide from its slide gate to the respective slide compartment which it previously occupied in said tray member after an image of that particular slide has been projected by said projection means.

2. The invention according to claim 1 wherein said means for imparting reciprocal movement to said carriage comprises a cam follower secured to said projector, and a cam rotatably supported by said carriage and coupled to said cam follower.

3. A slide projector adapted to be loaded with a slide tray member provided with a row of slide compartments in which respective slides are carried in generally aligned relation to one another in projection sequence, said projector comprising:
   two slide gates for receiving individual slides;
   means for projecting an image of a slide received in one of said slide gates and an image of a slide received in the other of said slide gates;
   means for shifting said slide tray member loaded onto said projector to position said row of slide compartments thereof alternately adjacent one of said slide gates and adjacent the other of said slide gates;
   means for indexing said slide tray member loaded onto said projector in opposed directions to locate different ones of said slide compartments in slide transferring relation to the one of said slide gates with which said row of slide compartments is adjacent, said tray indexing means comprising (1) a tray indexing pawl, (2) an indexing plate coupled to said pawl for moving said pawl generally in said opposed directions, and (3) a pawl moving plate coupled to said pawl for moving said pawl in a direction generally transverse to said opposed directions;
   slide transfer means for causing a slide to be transferred between its respective slide compartment and the one of said slide gates with which that particular slide compartment is located in slide transferring relation; and
   coordinating means coupled to said foregoing means for operatively coordinating the operation of said foregoing means such that successive ones of said slides are thereby transferred in said projection sequence from their respective tray compartments into reception by alternate ones of said slide gates and are returned in the same sequence to their same respective slide compartments after images thereof have been projected by said projection means, said coordinating means comprising cam means coupled to said indexing plate and said pawl moving plate for operating said plates in timed relation to selectively effect indexing of said tray member in said forward and reverse directions.

4. The invention according to claim 3 wherein said tray indexing pawl is secured to a pawl plate, said indexing plate is mounted for pivotal movement, and said pawl moving plate is mounted for reciprocal movement.

5. The invention according to claim 3 wherein said cam means comprises a pair of cams, and further comprising means for selectively coupling said pawl moving plate (1) to one of said cams to effect tray indexing in said one of opposed directions, and (2) to the other of said cams to effect tray indexing in the other of said opposed directions.

6. The invention according to claim 3 wherein:
   said tray indexing pawl is secured to a pawl plate;
   said indexing plate is mounted for pivotal movement;
   said pawl moving plate is mounted for reciprocal movement; and
   said cam means comprises (1) a pair of cams and (2) means for selectively coupling said pawl moving plate to one of said cams to effect tray indexing in one of said opposed directions and to the other of said cams to effect tray indexing in the other of said opposed directions.

7. A slide projector adapted to be loaded with a rotary slide tray unit including means defining a circular row of radially disposed slide compartments in which respective slides are arranged in projection sequence in a predetermined direction, said projector comprising:
   a housing,
   means defining two slide gates located in side-by-side relation to one another, each of said slide gates being adapted to accommodate one slide at a time;

8. A slide projector according to claim 7 including a carriage located within said housing and provided with means supporting said tray positioning means, tray indexing means and slide transfer means, said carriage being movable relative to said slide gate defining means and said housing by said tray shifting means to shift said tray positioning means and thereby said slide tray unit in unison therewith between said two different positions while simultaneously effecting corresponding movement of said tray indexing means and said slide transfer means.

9. The invention defined by claim 8 including:
   intermittently operable actuating means for imparting coordinated operative movement to said tray shifting means, said tray indexing means and said slide transfer means; and
   adjusting means for adjusting said actuating means selectively to
   1. a forward operating mode in which each operation of said actuating means causes the succeeding slide in the projection sequence to be transferred from its slide tray compartment into said gate means and to be displayed and the slide being displayed just prior to such operation to be returned from said gate means to the same slide tray compartment that it formerly occupied and
   2. a reverse operating mode in which each operation of said actuating means causes the preceeding slide in the projection sequence to be transferred from its slide compartment into said gate means and to be displayed and the slide being displayed just prior to that operation to be returned to the same slide tray that it formerly occupied.

10. The invention defined by claim 9 in which said actuating means comprises:
   a cam assembly comprising a plurality of cam elements;
   means supporting said cam assembly on said carriage for rotation about an axis in fixed relation to said carriage;
   drive means for imparting intermittent rotation to said cam assembly; and
   a plurality of cam follower members connected respectively with said tray shifting means, said tray indexing means and said slide transfer means and engageable respectively with different ones of said cam elements of said cam assembly to translate rotation of said cam assembly into predetermined coordinated movement of those three means.

11. The invention defined by claim 10 in which said adjusting means comprises a mechanism for selectively adjusting one of said cam follower members connected with said tray indexing means to engage either of two different cam elements of said cam assembly.

12. The invention defined by claim 10 in which said tray shifting means comprises:
an endless cam track comprising one of said cam elements of said cam assembly; and
a cam follower element mounted on said housing, said cam follower element being in constant mating engagement with said endless cam track.

13. The invention defined by claim 10 in which said axis of rotation of said cam assembly is parallel to the rotational axis of said slide tray unit established by said tray positioning means.

14. The invention defined by claim 8 in which said projection means includes:
light source means for simultaneously illuminating slides accommodated in both of said slide gates;
two projection lens systems located forwardly of respective ones of said slide gates to project images of the respective slides accommodated thereby onto substantially the same region of said remote projection surface; and
a mask member supported by said carriage and movable therewith between a first location at which said mask member obscures one of said projection lens systems and a second location at which said mask system obscures the other of said lens systems.

15. The invention defined by claim 9 including:
orientation means for preventing said slide tray unit from being loaded onto and removed from said projector except when said slide tray unit is rotationally oriented to a predetermined loading and unloading position; and
a select-release mechanism operable to adjust said actuating means to a select-release mode of operation in which said tray shifting means, said tray indexing means and said slide transfer means cooperate sequentially
1. to return to its respective slide compartment of said slide tray unit loaded onto said projector any slide accommodated in either of said slide gates,
2. to prevent the transfer of any slide out of its respective slide tray compartment in said slide tray unit loaded onto said projector, and
3. to release said tray indexing means from engagement with said tray unit loaded onto said projector to permit said slide tray unit to be rotated manually to said loading and unloading position.

16. The invention defined by claim 15 including:
a tray locking member movable from an inoperative position to an operative position at which said tray locking member prevents a slide tray unit loaded onto said projector from being removed therefrom regardless of the rotational orientation of said slide tray unit;
means for maintaining said tray locking member normally in said operative position; and
releasing means operated by said select-release mechanism for temporarily moving said tray locking member to said inoperative position after said tray indexing means has been released from engagement with said slide tray unit by said select-release mechanism.

17. The invention defined by claim 7 including:
two pressure members associated respectively with corresponding ones of said slide gates;
resilient means biasing each of said pressure members toward a closed position in which it resiliently engages and positions a slide accommodated in the corresponding slide gate; and
gate opening means carried by said carriage and movable therewith into operative cooperation with the pressure member associated with the one of said slide gates with which said slide transfer means is then in cooperative relation, said gate opening means being adapted during the transfer of a slide from said slide tray unit into that slide gate to move that pressure member in opposition to said resilient means to an open position beyond resilient engagement with that slide.

* * * * *

UNITED STATES PATENT OFFICE
CERTIFICATE OF CORRECTION

PO-1050
(5/69)

Patent No. 3,677,631            Dated July 18, 1972

Inventor(s) George M. Inglis

It is certified that error appears in the above-identified patent and that said Letters Patent are hereby corrected as shown below:

Column 18, after line 33, insert -- projection means for displaying alternately slides accommodated in alternate ones of said two slide gates by projecting images thereof onto a remote projection surface;

means cooperable with a slide tray unit loaded onto said projector for positioning said slide tray unit for rotation about the axis of said circular row of slide compartments;

means for moving said tray positioning means and said slide tray unit positioned thereby in alternate opposite directions to two different positions to bring said row of slide compartments alternately into alignment with one and the other of said slide gates;

means movable with said tray positioning means and engageable with said slide tray unit at both of said two different positions thereof for rotationally indexing said slide tray unit in either of said predetermined directions to align different ones of said slide compartments with the one of said slide gates then in alignment with said row of slide compartments; and

UNITED STATES PATENT OFFICE
CERTIFICATE OF CORRECTION

Patent No. 3,677,631                    Dated July 18, 1972

- 2 -

Inventor(s) George M. Inglis

It is certified that error appears in the above-identified patent and that said Letters Patent are hereby corrected as shown below:

slide transfer means movable with said tray positioning means into cooperative relation with the one of said slide gates with which said row of slide compartments is then aligned, said slide transfer means being adapted to effect transfer of a slide between the one of said slide gates with which it is in cooperative relation and the slide compartment then aligned with that same slide gate by said tray positioning means and said tray indexing means. --

Signed and sealed this 9th day of January 1973.

(SEAL)
Attest:

EDWARD M. FLETCHER, JR.
Attesting Officer

ROBERT GOTTSCHALK
Commissioner of Patents